US010771146B1

(12) United States Patent
Singh et al.

(10) Patent No.: US 10,771,146 B1
(45) Date of Patent: Sep. 8, 2020

(54) REDUNDANCY FOR SATELLITE UPLINK FACILITIES USING SOFTWARE-DEFINED NETWORKING

(71) Applicant: AT&T Intellectual Property I, L.P., Atlanta, GA (US)

(72) Inventors: Vaibhav Singh, Playa Del Rey, CA (US); Vishal Arya, Manhattan Beach, CA (US); Christopher Cugno, Anaheim Hills, CA (US); Hirad Rowshan, San Pedro, CA (US); Sunil Jethwani, Los Angeles, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/454,135

(22) Filed: Jun. 27, 2019

(51) Int. Cl.
*H04B 7/185* (2006.01)
(52) U.S. Cl.
CPC ....... *H04B 7/18534* (2013.01); *H04B 7/1858* (2013.01); *H04B 7/18563* (2013.01)
(58) Field of Classification Search
CPC .............. H04B 7/18534; H04B 7/1858; H04B 7/18563; H04N 21/6193; H04N 21/2181; H04N 21/2743; H04N 21/4147; H04N 21/64707; H04H 40/90; H04H 2201/37; H04H 60/11; H04H 60/82

USPC ....................................................... 455/12.1
See application file for complete search history.

(56) References Cited

U.S. PATENT DOCUMENTS 9,510,060 B1    11/2016  Arya et al.
2011/0105023 A1*  5/2011  Scheer ................... H01Q 1/242
                                                          455/41.2

* cited by examiner

*Primary Examiner* — Shaima Q Aminzay
(74) *Attorney, Agent, or Firm* — Hartman & Citrin LLC

(57) ABSTRACT

Concepts and technologies disclosed herein are directed to providing redundancy for satellite uplink facilities using software-defined networking ("SDN"). According to one aspect disclosed herein, a satellite network system can include a video collection facility ("VCF"), a remote uplink facility ("RUF"), and a diverse uplink facility ("DUF") in direct communication with a core network. An SDN controller that operates in an SDN network that provides logical SDN links to the VCF, the RUF, the DUF, and the core network. The SDN controller can track a site configuration of the RUF. The SDN controller can detect that the RUF has been downed due to an adverse event such as inclement weather. The SDN controller can obtain the site configuration of the RUF. The SDN controller can cause a redundant remote uplink facility ("RRUF") to be instantiated with the site configuration of the RUF.

14 Claims, 24 Drawing Sheets

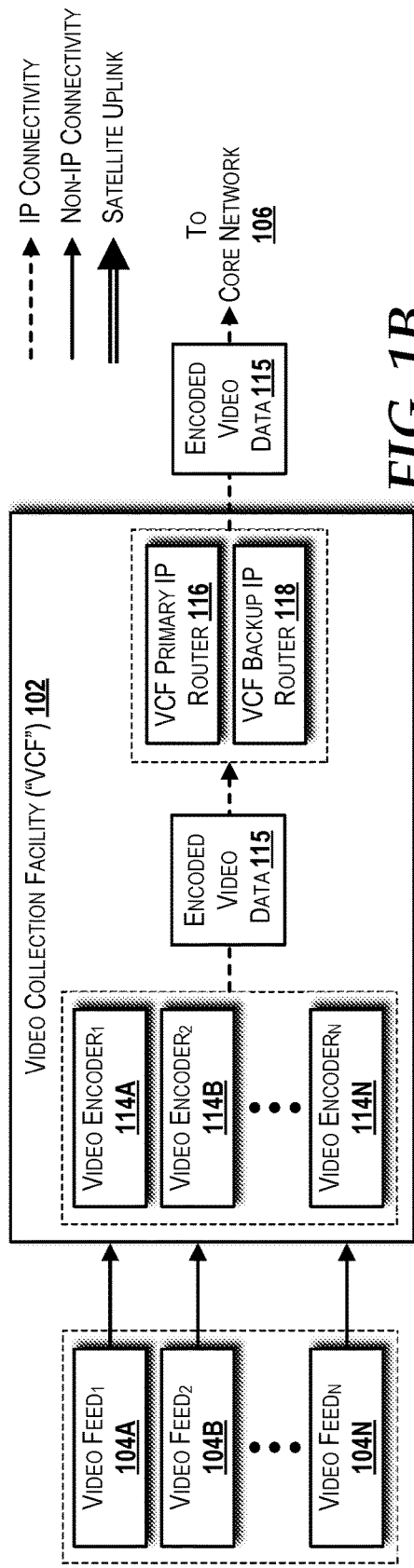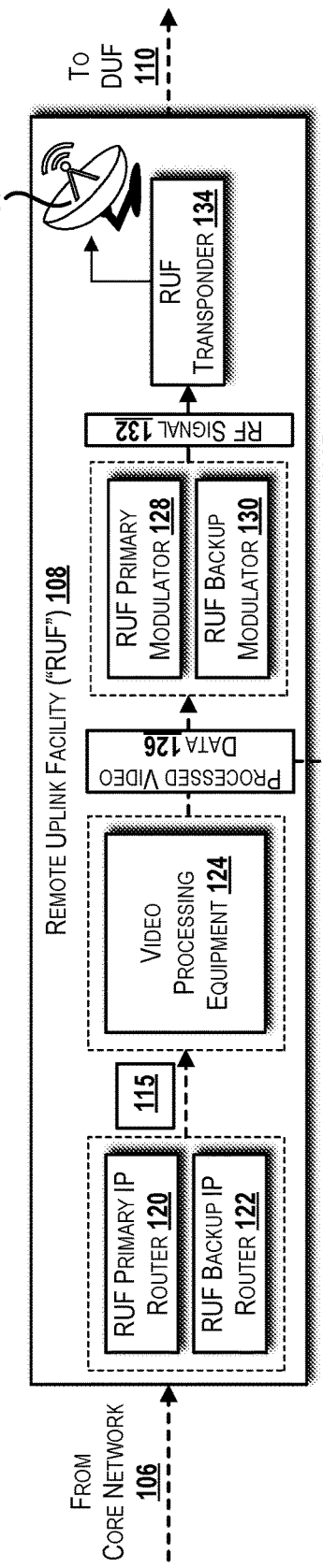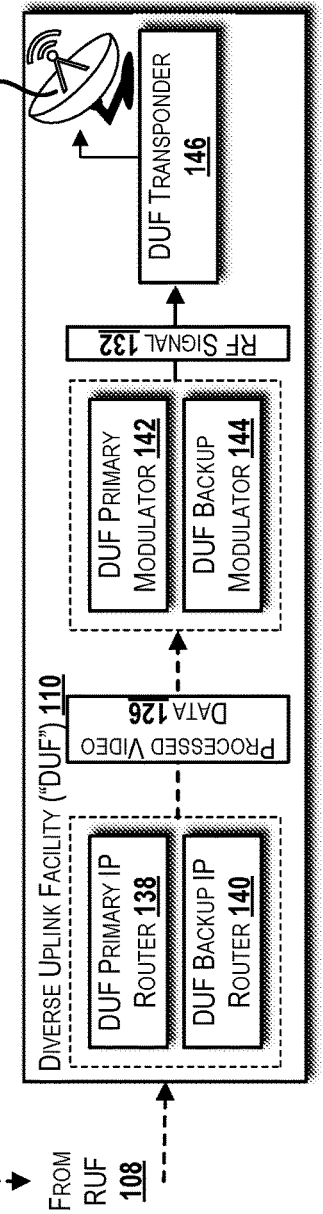

REDUNDANCY FOR SATELLITE UPLINK FACILITIES USING SOFTWARE-DEFINED NETWORKING

BACKGROUND

In the current video acquisition and linear satellite delivery design, video feeds are collected from various local collection facilities ("LCFs") all over the country, aggregated over a core network, and then uplinked to satellites via one of many remote uplink facilities ("RUFs"). Each RUF can include equipment for processing the video feeds and uplinking the video feeds to one or more satellites.

A RUF can be associated with a diverse uplink facility ("DUF") that is used as a backup uplink to the satellite(s) in response to inclement weather or another adverse event that blocks the RUF from uplinking video feeds to the satellite(s). Each DUF is typically located about 20 to 50 miles from its associated RUF. Signals automatically switch to the DUF during an adverse event and switch back to the RUF when the adverse event ends. This design has a major limitation. In particular, video feeds are assembled by video processing equipment at the RUF; therefore if the RUF is downed, the DUF does not have access to any video data to uplink to the satellite(s). Moreover, since the DUFs depend on the RUFs for network connectivity to the core network, if a RUF goes down, the DUF cannot take over uplink transmission from the RUF.

SUMMARY

Concepts and technologies disclosed herein are directed to providing redundancy for satellite uplink facilities using software-defined networking ("SDN"). According to one aspect disclosed herein, a satellite network system can include a video collection facility ("VCF"), a remote uplink facility ("RUF"), a diverse uplink facility ("DUF") in directed communication with a core network in communication, and an SDN controller that operates in an SDN network that provides logical SDN links to the VCF, the RUF, the DUF, and the core network. The SDN controller can track a site configuration of the RUF. The SDN controller can detect that the RUF has been downed due to an adverse event such as inclement weather. The SDN controller can obtain the site configuration of the RUF. The SDN controller can cause a redundant remote uplink facility ("RRUF") to be instantiated with the site configuration of the RUF.

In some embodiments, a site configuration can include a network configuration of the RUF to be configured for the RRUF. The network configuration can specify network connectivity between the RUF, the VCF, the DUF, and the core network. In some embodiments, a site configuration can include a video processing equipment configuration of the RUF to be configured for the RRUF. In some embodiments, a site configuration can include a configuration of a native RUF function provided by the RUF.

In some embodiments, the RRUF can be instantiated on a cloud computing platform. The cloud computing platform can include a plurality of virtual resources capable of handling a designed marketing area ("DMA") having a highest concentration.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1B is a block diagram illustrating a video collection facility ("VCF") and components thereof.

FIG. 1C is a block diagram illustrating a remote uplink facility ("RUF") and components thereof.

FIG. 1D is a block diagram illustrating a diverse uplink facility ("DUF") and components thereof.

DETAILED DESCRIPTION

Figure 1A:
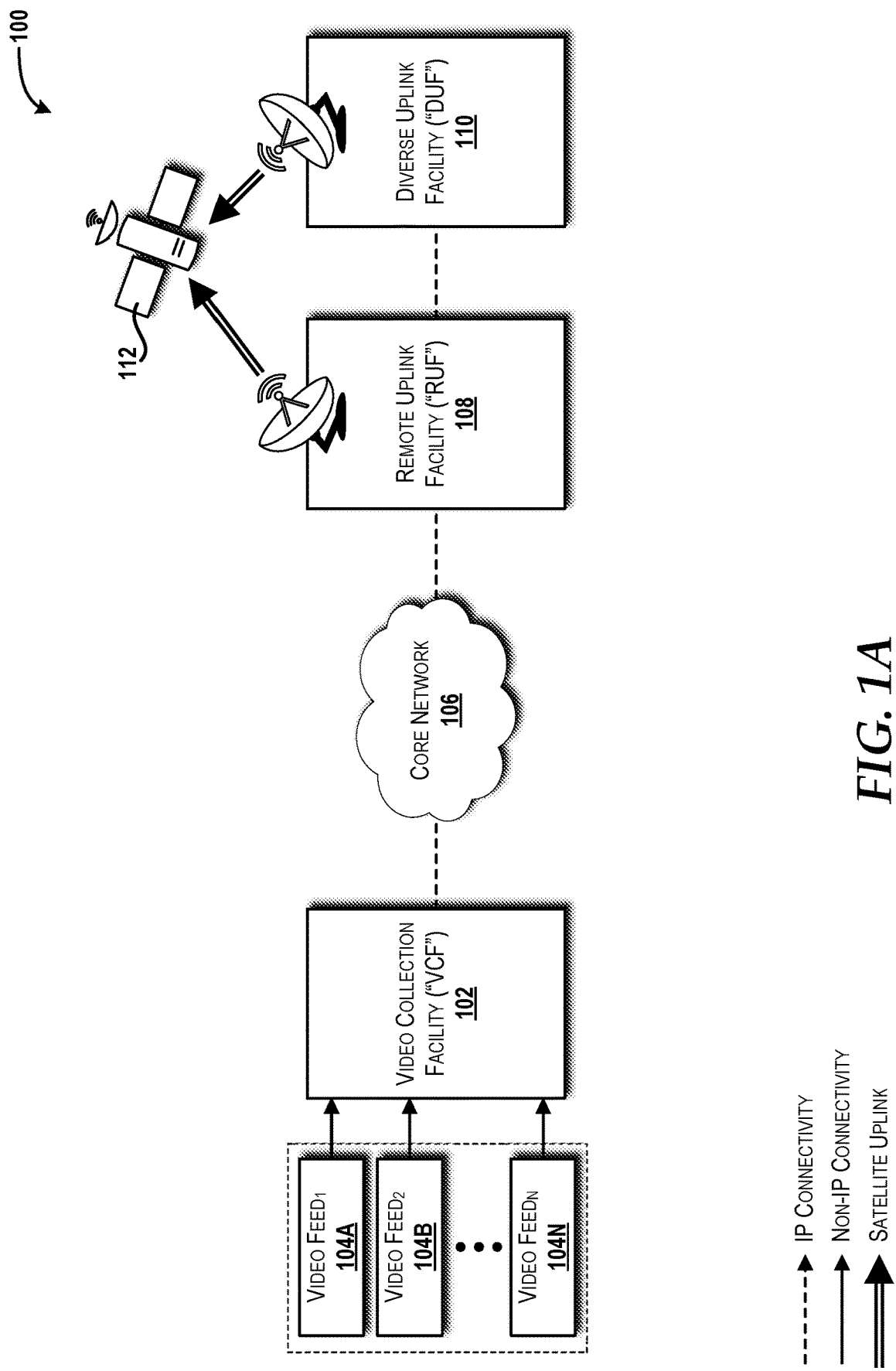
FIG. 1A is a block diagram illustrating a current satellite network system for providing a current linear satellite video broadcast service.

Concepts and technologies disclosed herein are directed, at least in part, to providing redundancy for satellite uplink facilities using software-defined networking ("SDN"). With the migration of linear satellite video acquisition and delivery to an all-IP broadcast chain, broadcast signals are no longer confined to specific wires in specific buildings. For example, a local television channel can originate in Georgia, be processed in Minnesota, and uplinked to a satellite from New Hampshire. Channels are now just data streams and can be transmitted nearly anywhere. This provides powerful capabilities to improve overall satellite infrastructure resiliency.

With the advent of SDN, the process of moving traffic (e.g., television channel broadcast streams) and redeploying or reconfiguring network infrastructure can now be achieved using SDN applications built on top of one or more SDN controllers. Both of these recent developments facilitate a new way to provide redundancy for remote uplink facilities ("RUFs") by deploying a redundant RUF to take over any existing RUF that has been downed due to an adverse event, and the signals can be uplinked to one or more satellites from a diverse uplink facility ("DUF") associated with the downed RUF.

Currently, video streams for DUFs are assembled by video processing equipment implemented at the RUF. To make sure the DUF still has access to video streams, each DUF would need to have independent connectivity to the core network (via which all the streams are available). An additional site can be deployed (preferably close to the center of the core network) with access to all RUFs and their associated DUFs with enough resources to deploy a RUF site configuration and to support equipment for handling video traffic associated with any RUF site that goes down.

The concepts and technologies described herein provide a redundant RUF that can handle all the video processing for video data and can link to one or more DUF sites via the core network, thereby enabling the DUF to have access to the video content, which can then be uplinked out of the DUF to one or more satellite(s). When a RUF goes down, the network and device configurations can be imported via SDN, and the DUF can then be used to uplink the video data to the satellite(s).

The concepts and technologies disclosed herein can apply to any linear satellite video broadcast services, such as those available from DIRECTV and others. The concepts and technologies described herein can provide resiliency to uplink facilities that is not available for current linear satellite video broadcast services. RUFs are susceptible to equipment failures, human errors, fires, earthquakes, other natural disasters, weather, accidents, and other adverse events. Each RUF carries many different channels, and the loss of a RUF will result in an outage on all these channels that cannot be alleviated via the existing RUF-DUF design. The new design disclosed herein provides a backup RUF site designed to take over video processing, and utilizes the existing DUF to take over satellite uplink functions, thereby mitigating the effects of the outage. This design also creates an opportunity to deploy automated disaster mitigation systems that can potentially recover from a disaster in minutes rather than hours or days in the current design.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Turning now to FIG. 1A, a block diagram illustrating a high level overview of a current satellite network system 100 for providing a current linear satellite video broadcast service will be described. The current satellite network system 100 includes a video collection facility ("VCF") 102 that collects video data from a plurality of video feeds 104A-104N (hereinafter referred to individually as "video feed 104", or collectively as "video feeds 104") that may originate from one or more video sources. For example, the video feeds 104 can be received by the VCF 102 from one or more television stations. The VCF 102 provides the video feeds 104 over a core network 106 (also known as a backhaul network or backbone network) to one or more RUFs 108 that, in turn, process the video feeds 104 for uplink to one or more satellites 112. In response to an adverse event, such as an equipment failure, human error, fire, earthquake, other natural disaster, inclement weather, or accident, the RUF 108 can redirect video traffic to a DUF 110 for uplinking the video traffic to the satellite(s) 112. The current satellite network system 100 is illustrative of a common infrastructure for handling current linear satellite video broadcast services. Those skilled in the art will understand that a particular implementation of the current satellite network system 100 may include multiple VCFs 102, multiple RUFs 108, and/or multiple DUFs 112.

Turning now to FIG. 1B, an example VCF 102 and components thereof are shown. The illustrated VCF 102 includes a plurality of video encoders 114A-114N (hereinafter referred to individually as "video encoder 114", or collectively as "video encoders 114") that encode the video feeds 104 into one or more video coding formats, some examples of which include MPEG-2 Part 2, MPEG-4 Part 2, H.264, HEVC, THEORA, REALVIDEO RV40, VP9, and AV1. The video encoders 114 pass encoded video data 115 to one or more Internet protocol ("IP") routers, such as a VCF primary IP router 116 and a VCF backup IP router 118. The VCF primary IP router 116 and the VCF backup IP router 118 can provide primary and backup IP connectivity, respectively, to the core network 106.

Turning now to FIG. 1C, an example RUF 108 and components thereof are shown. The illustrated RUF 108 receives, from the core network 106, the encoded video data 115 via a RUF primary IP router 120 and a RUF backup IP router 122 that, in turn, provide the encoded video data 115 to video processing equipment 124, which can include equipment for multiplexing, encrypting, and performing other video processing functions on the encoded video data 115, thereby creating processed video data 126. The video processing equipment 124 provides the processed video data 126 to a RUF primary modulator 128 and a RUF backup modulator 130 that modulate the processed video data 126 and generate an RF signal 132 for uplink via a RUF transponder 134 through a satellite antenna 136A to the satellite(s) 112 (best shown in FIG. 1A). The RUF 108 also provides the processed video data 126 to the DUF 110 in case the RUF transponder 134 is downed due to an adverse event.

Turning now to FIG. 1D, an example DUF 110 and components thereof are shown. The illustrated DUF 110 receives, from the RUF 108, the processed video data 126 via a DUF primary IP router 138 and a DUF backup IP router 140 that, in turn, provide the processed video data 126 to a DUF primary modulator 142 and a DUF backup modulator 144 that modulate the processed video data 126 and generate an RF signal 132 for uplink via a DUF transponder 146 through a satellite antenna 136B to the satellite(s) 112 (best shown in FIG. 1A).

Figure 1E:
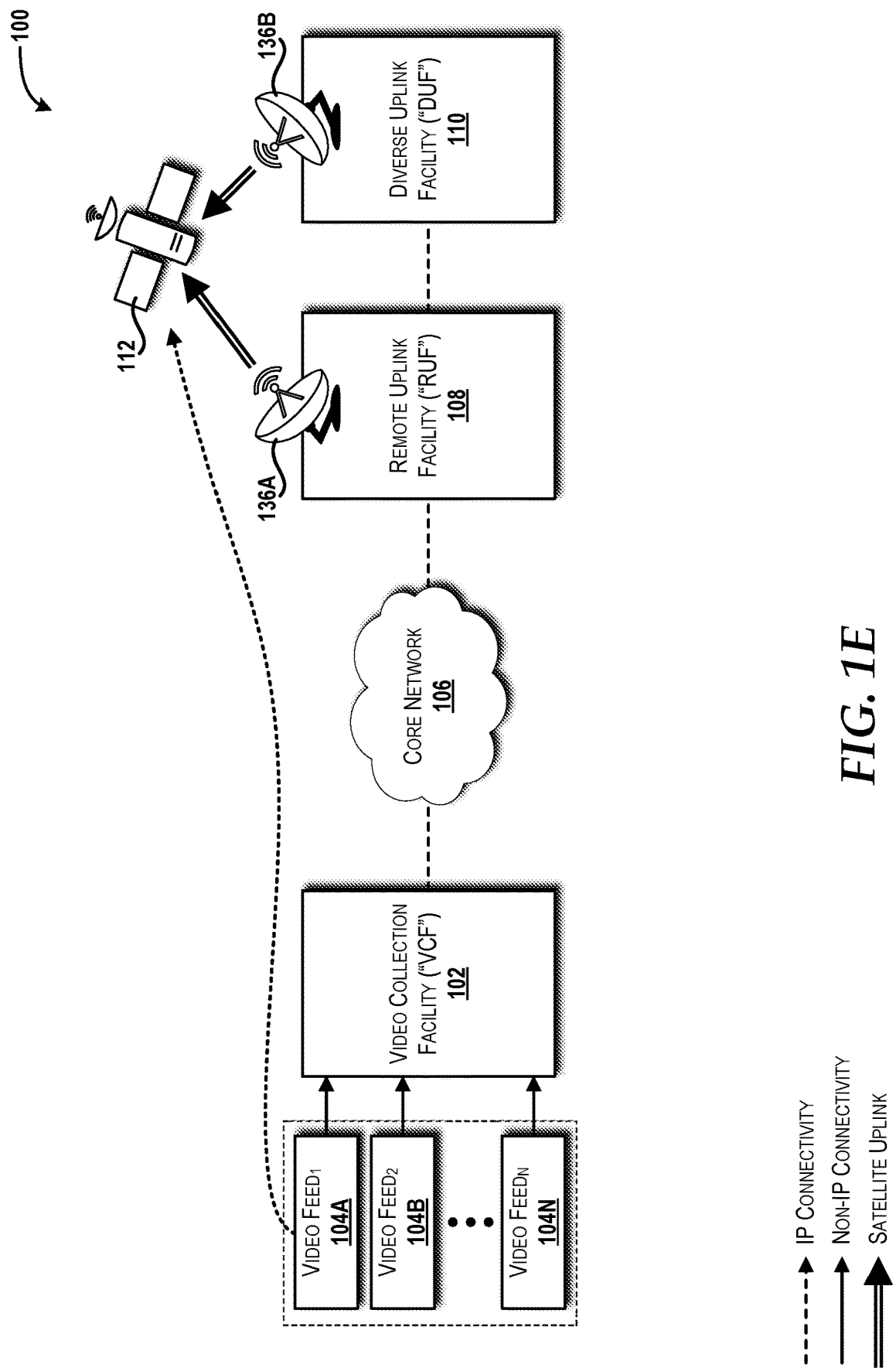
FIG. 1E is a block diagram illustrating the current satellite network system for providing the current linear satellite broadcast service during normal operation.
Figure 1F:
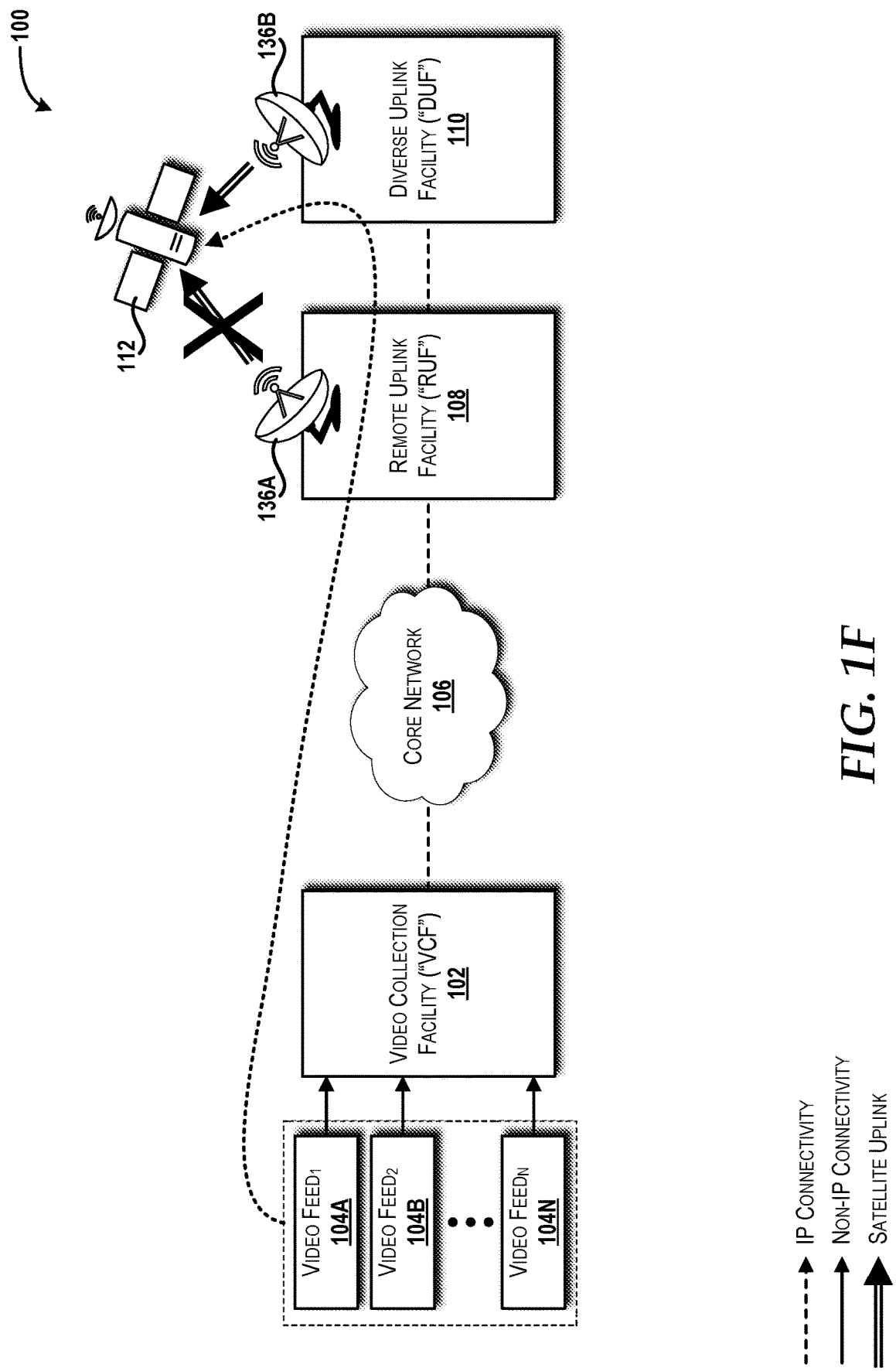
FIG. 1F is a block diagram illustrating the current satellite network system for providing the current linear satellite broadcast service during an adverse event that downs the RUF uplink to one or more satellites.
Figure 1G:
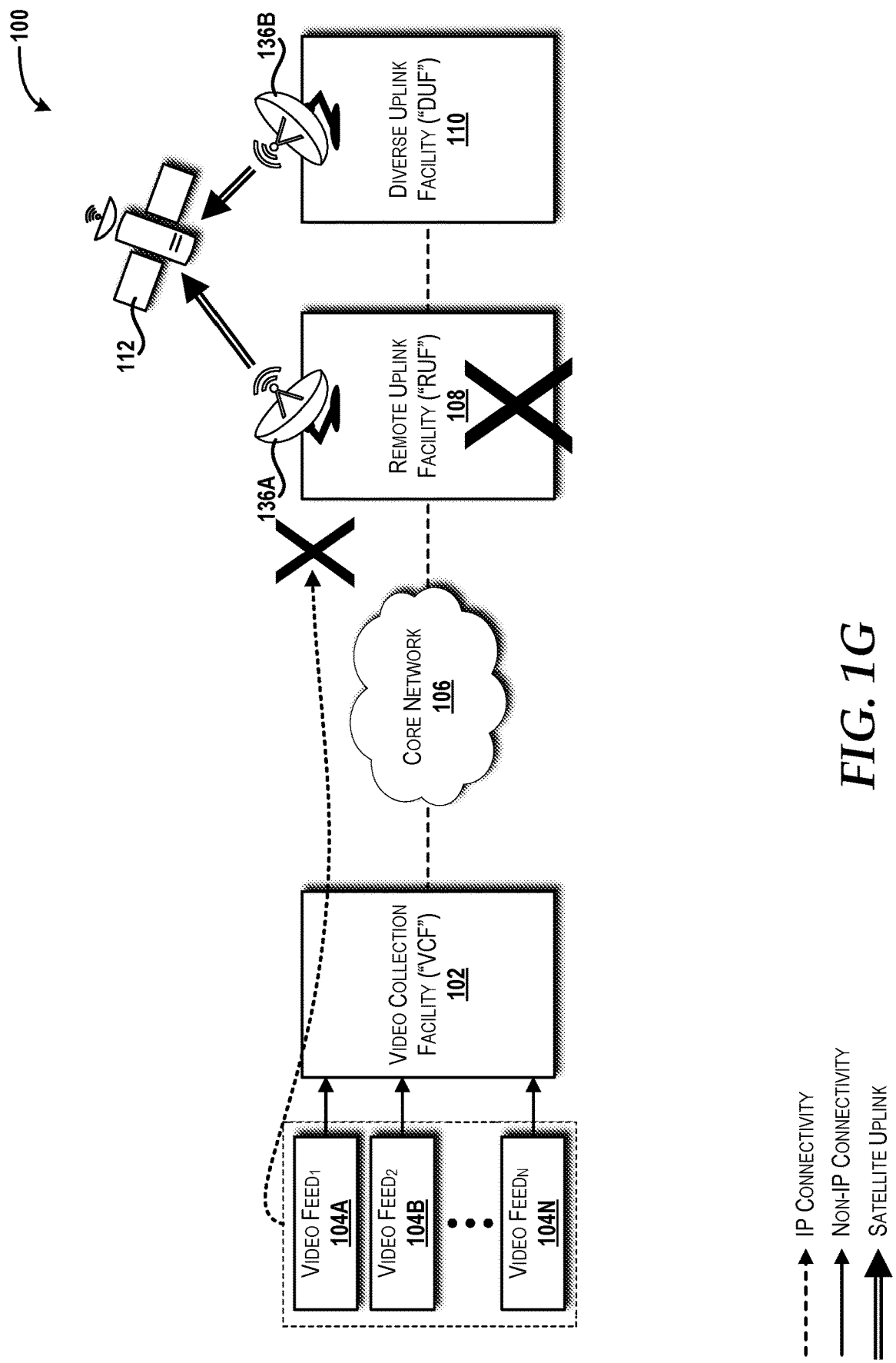
FIG. 1G is a block diagram illustrating the current satellite network system for providing the current linear satellite broadcast service during an adverse event that downs the RUF.

Turning now to FIG. 1E, the current satellite network system 100 for providing the current linear satellite broadcast service is shown during normal operation (e.g., no inclement weather or other adverse events) such that video data associated with the video feeds 104 is sent via the RUF 108 to the satellite(s) 112. In FIG. 1F, the current satellite network system 100 is shown during an inclement weather event or other adverse event that prevents the RUF 108 from transmitting the video data to the satellite(s) 112 (i.e., the RUF transponder 134 is down). In response, the video data is routed to the DUF 110 that provides the uplink to the satellite(s) 112. In FIG. 1G, the current satellite network system 100 is shown with the RUF 108 in a downed state. If the RUF 108 goes down, the DUF 110 cannot uplink any video data because the DUF 110 has neither the video processing equipment 124, nor access to the core network 106 to obtain the video feeds 104 from the VCF 102.

The concepts and technologies disclosed herein alleviate the aforementioned limitations and others of the current satellite network system 100. In particular, by using a virtualized backup and redundant remote uplink facility, applications can be deployed (automatically or manually) to take over network configuration settings, video processing functionality, and/or other native RUF functions from a downed RUF 108. Moreover, by adding a direct link from the DUF 110 to the core network 106, video processed at the redundant remote uplink facility can be uplinked to the satellite(s) 112 via the DUF 110.

Figure 1H:
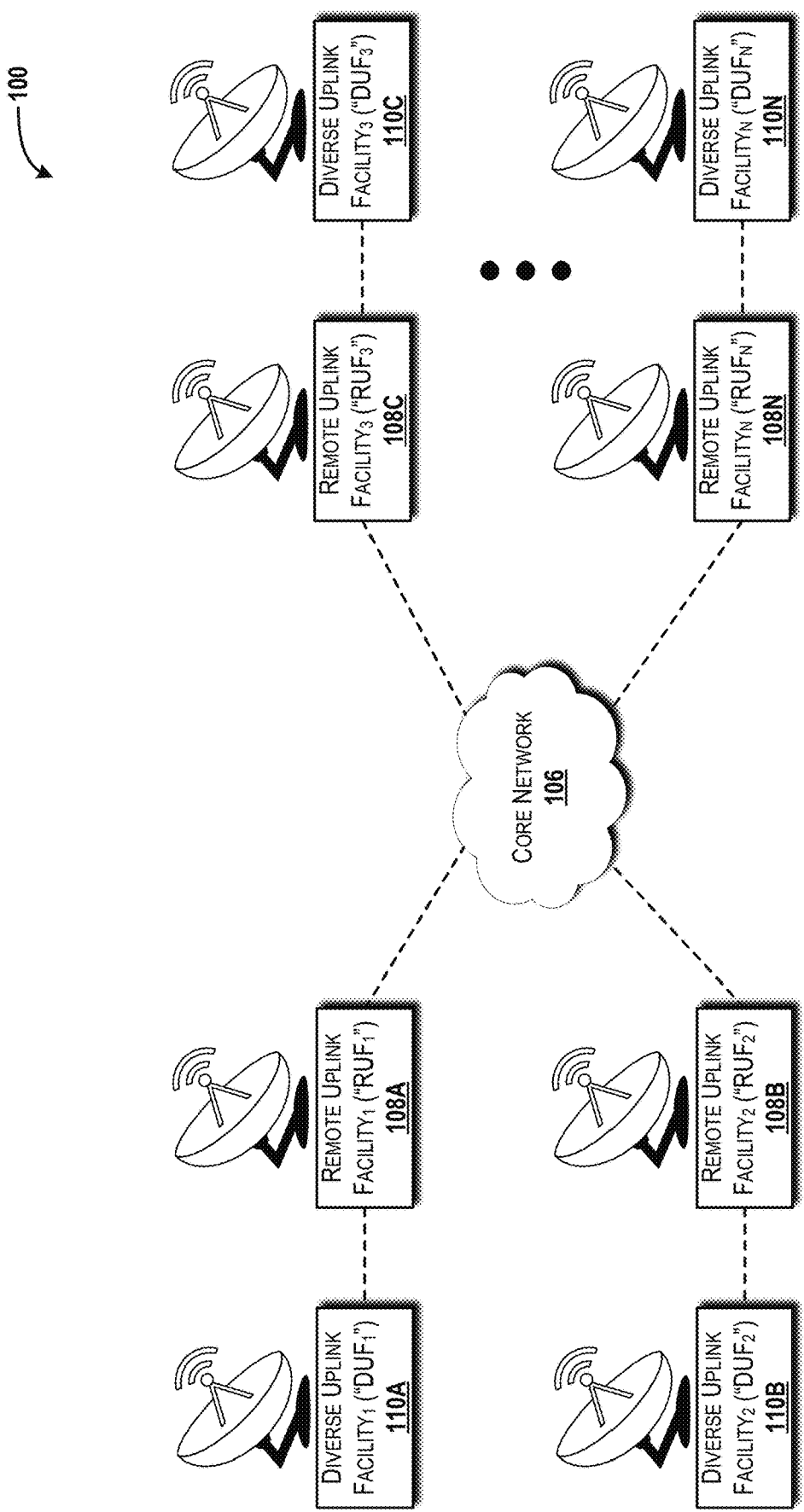
FIG. 1H is a block diagram illustrating connectivity of the DUFs and the RUFs to a core network in the current satellite network system.

Turning now to FIG. 1H, connectivity of the current satellite network system 100 is shown. In particular, the DUFs 110A-110N are connected to the core network 106 via the RUFs 108A-108N, respectively. In this configuration, if any of the RUFs 108 goes down, the corresponding DUF 110 cannot uplink any video data because the DUF 110 has neither the video processing equipment 124 for video processing, nor access to the core network 106 to obtain the video feeds 104 from the VCF 102.

Figure 2A:
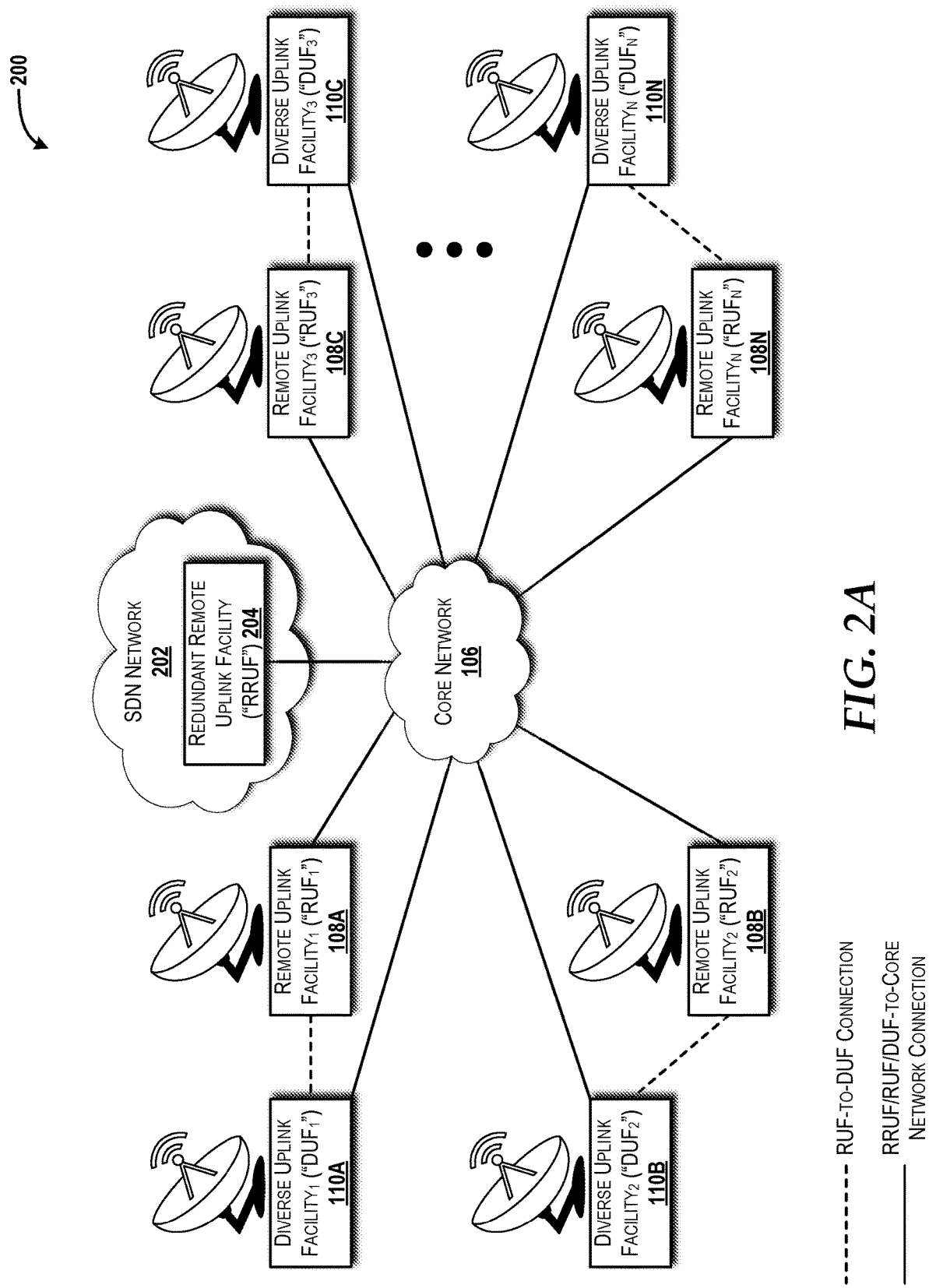
FIG. 2A is a block diagram illustrating connectivity of the DUFs and the RUFs to a core network for providing a new linear satellite video broadcast service, according to an illustrative embodiment.

Turning now to FIG. 2A, a new satellite network system 200 will be described, according to an illustrative embodiment. The new satellite network system 200 changes the current design, such as the design shown in the current satellite network system 100 in FIG. 1H, to alleviate the aforementioned shortcomings. In particular, the new satellite network system 200 implements direct connectivity between the DUFs 110 and the core network 106, and includes an SDN network 202 to provide a backup RUF, which is referred to herein as a redundant RUF ("RRUF") 204, that can take over the video aggregation, assembly, and/or other video processing functions from a downed RUF 108, and the corresponding DUF 110 can take over the satellite uplink functions, thereby mitigating the effects of an adverse event.

Figure 2B:
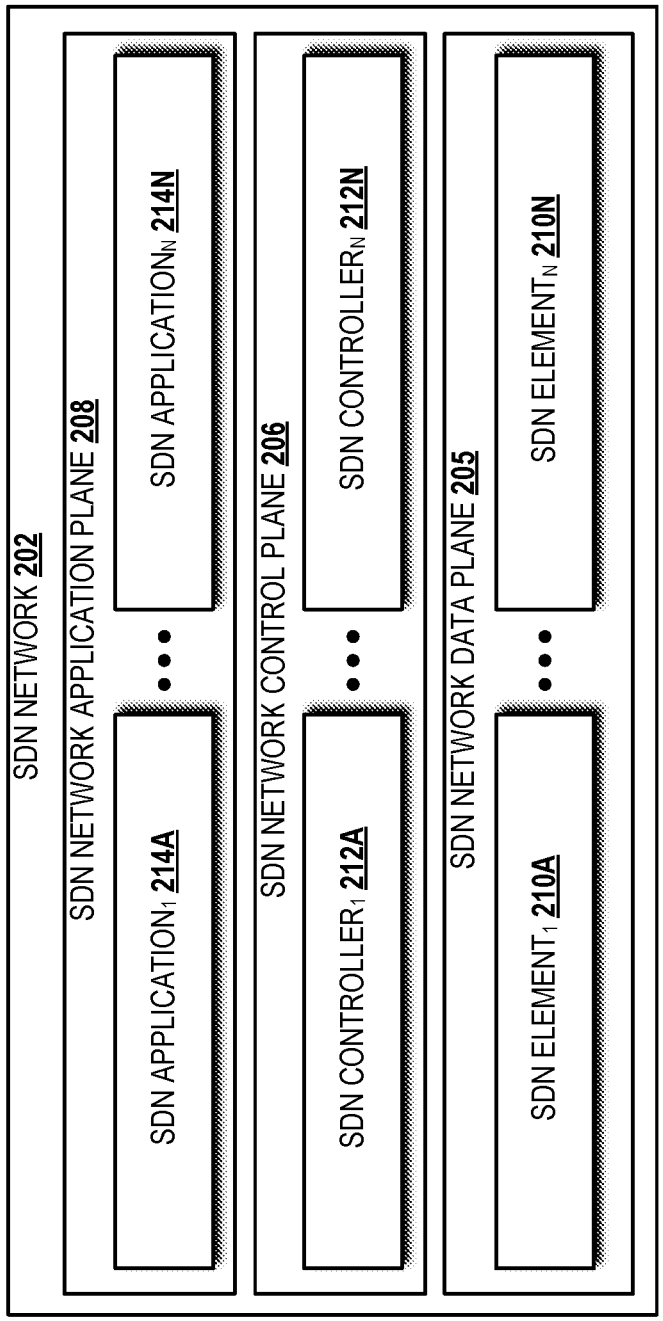
FIG. 2B is a block diagram illustrating a software-defined networking ("SDN") network and components thereof in which aspects of the concepts and technologies disclosed herein can be implemented.

Turning now to FIG. 2B, an implementation of the SDN network 202 for the new satellite network system 200 will be described, according to an illustrative embodiment. The SDN network 202 is a network implemented in accordance with SDN concepts. SDN is an architectural framework for creating intelligent networks that are programmable, application aware, and more open. SDN provides an agile and cost-effective communications platform for handling the dramatic increase in data traffic on networks by providing a high degree of scalability, security, and flexibility. SDN provides several benefits. SDNs can allow for the creation of multiple, virtual network control planes on common hardware. SDN can help extend service virtualization and software control into many existing network elements. SDN enables applications to request and manipulate services provided by the network and allow the network to expose network states back to the applications. SDN exposes network capabilities through application programming interfaces ("APIs"), making the control of network equipment remotely accessible and modifiable via third-party software clients, using open protocols such as OpenFlow, available from Open Network Forum ("ONF").

The illustrated SDN network 202 includes an SDN network data plane 205, an SDN network control plane 206, and an SDN network application plane 208. The SDN network data plane 205 is a network plane responsible for bearing data traffic, such as video data associated with the video feeds 104. The illustrated SDN network data plane 205 includes SDN elements 210A-210N (hereinafter referred to individually as "SDN element 210", or collectively as "SDH elements 210"). The SDN elements 210 can be or can include SDN-enabled network elements such as switches, routers, gateways, the like, or any combination thereof. In some embodiments, the SDN elements 210A-210N can utilize OpenFlow protocols, although other SDN protocols are contemplated.

The SDN network control plane 206 is a network plane responsible for controlling the SDN elements 210 of the SDN network data plane 205. The illustrated SDN network control plane 206 includes SDN controllers 212A-212N (hereinafter referred to individually as "SDN controller 212", or collectively as "SDN controllers 212"). The SDN controllers 212 are logically centralized network entities that perform operations, including translating an intent of one or more SDN applications 214A-214N (hereinafter referred to individually as "SDN application 214", or collectively as "SDN applications 214") operating within the SDN network application plane 208 to rules and action sets that are useable by the SDN elements 210 operating within the SDN network data plane 205. The rules can include criterion such as, for example, switch port, virtual local area network identifier ("VLAN ID"), VLAN priority code point ("PCP"), media access control ("MAC") source address, MAC destination address, Ethernet type, IP source address, IP destination address, IP type of service ("ToS"), IP protocol, L4 source port, and L4 destination port. The rules can be matched to one or more actions such as, for example, an action to forward traffic to one or more ports, an action to drop one or more packets, an action to encapsulate one or more packets and forward to an SDN controller 212, an action to send one or more packets to a normal processing pipeline, and an action to modify one or more fields of one or more packets. Those skilled in the art will appreciate the breadth of possible rule and action sets utilized in a particular implementation to achieve desired results. As such, the aforementioned examples should not be construed as being limiting in any way.

The illustrated SDN network application plane 208 is a network plane responsible for providing the SDN applications 214. The SDN applications 214 are programs that can explicitly, directly, and programmatically communicate network requirements/intents and desired network behavior to the SDN controllers 212. Separation of the SDN network control plane 206 from the SDN network data plane 205 enables the new satellite network system 200 to deploy the SDN applications 214 relevant to only a specific piece of the whole satellite network infrastructure. In some embodiments, the SDN applications 214 can include network automation applications, video centric view applications (e.g., show all FOX channels, such as continental United States ("CONUS") and Local—in one view), traffic engineering applications, capacity planning applications, bandwidth monitoring applications, flow-based control applications, disaster recovery applications, flow tap applications, other monitoring applications, and the like. The SDN applications 214 can vary based upon the needs of a particular implementation of the SDN network 202, and as such, the examples provided herein are merely exemplary of some of the SDN applications 214 that can be deployed, and should not be construed as being limiting in any way.

Figure 2C:
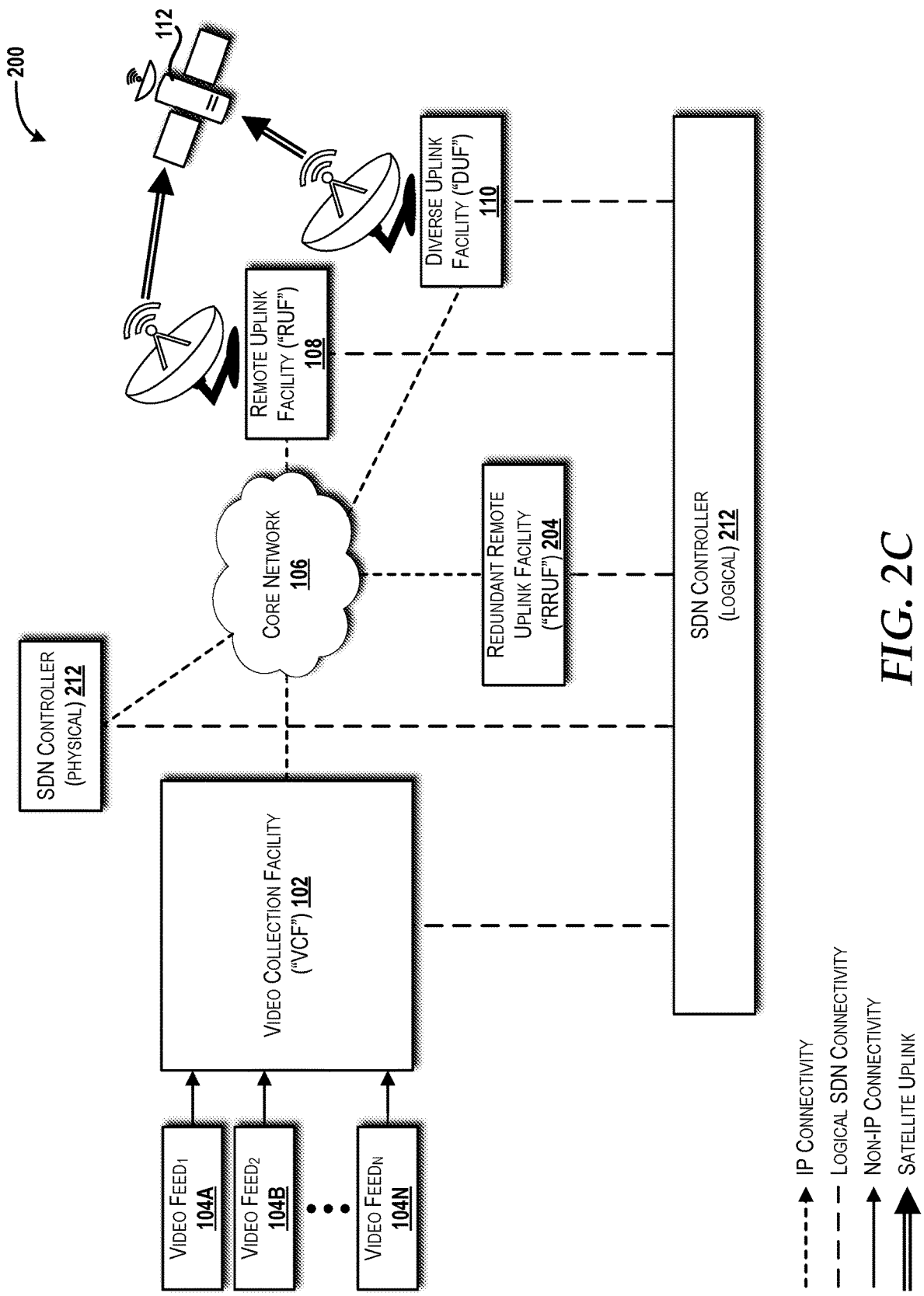
FIG. 2C is a block diagram illustrating a new satellite network system for providing a new linear satellite video broadcast service with a redundant remote uplink facility ("RRUF"), according to an illustrative embodiment.

Turning now to FIG. 2C, the new satellite network system 200 will be for providing the new linear satellite video broadcast service with the RRUF 204 will be described, according to an illustrative embodiment. In the illustrated embodiment, the SDN controller 212 is logically placed on top of the core network 106, and has visibility (via logical SDN links) and access to each of the VCF 102 and the uplink facilities, including the RUF 108, the DUF 110, and the RRUF 204 in the illustrated example.

Figure 2D:
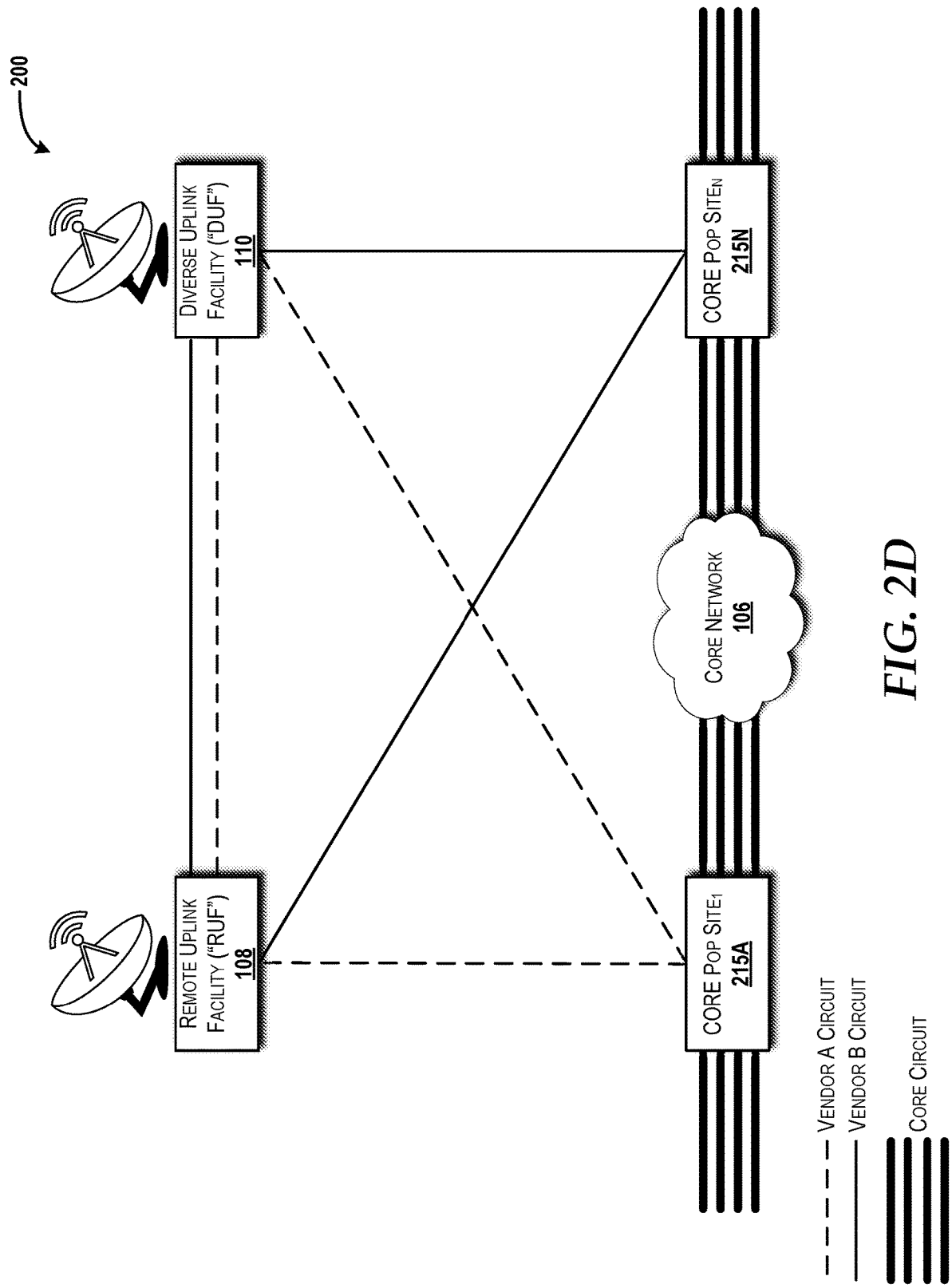
FIG. 2D is another block diagram illustrating connectivity of the DUFs and the RUFs to a core network for providing a new linear satellite video broadcast service, according to an illustrative embodiment.

Turning now to FIG. 2D, another aspect of the new satellite network system 200 illustrating connectivity of the DUFs 110 and the RUFs 108 to the core network 106 will be described, according to an illustrative embodiment. In the illustrated example, the RUF 108 and the DUF 110 are connected via multiple vendor circuits. In addition, the DUF 110 now has connectivity to the core network 106 via one or more core point of presence ("POP") sites 215A-215N.

Returning briefly to FIG. 1H, the current satellite network system 100 requires the DUFs 110 to communicate with the core network 106 through the RUFs 108. As shown in FIG. 2D, by moving the connectivity from the DUF 110 to the core network 106, the new satellite network system 200 can ensure that the DUF 110 will always have access to all of the video feeds 104 and to all other sites, even if the corresponding RUF 108 to which the DUF 110 is connected is downed or otherwise no longer in commission.

Figure 2E:
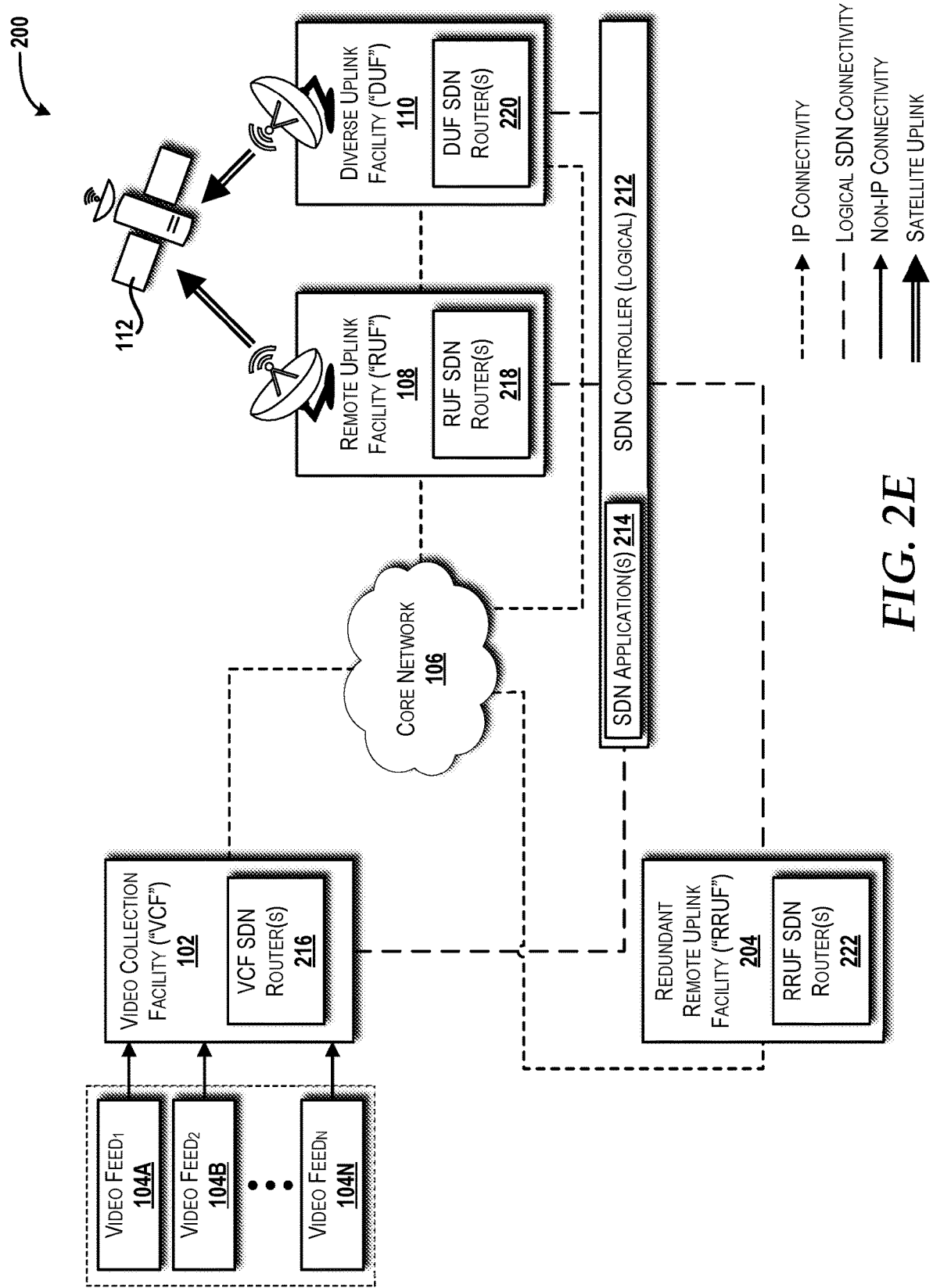
FIG. 2E is a block diagram illustrating the new satellite network system for providing the new linear satellite broadcast service during normal operation, according to an illustrative embodiment.

Turning now to FIG. 2E, the new satellite network system 200 for providing the new linear satellite broadcast service during normal operation will be described, according to an illustrative embodiment. In particular, FIG. 2E shows the deployment of the RRUF 204, which can be instantiated by the SDN controller 212 as a backup for the RUF 108. The VCF 102, the RUF 108, the DUF 110, and the RRUF 204 can communicate via logical SDN links managed by the SDN controller 212. In the illustrated example, video data can be transmitted among the VCF 102, the RUF 108, the DUF 110, and the RRUF 204 via one or more VCF SDN routers 216, one or more RUF SDN routers 218, one or more DUF SDN routers 220, and one or more RRUF SDN routers 222 at the control of the SDN controller 212.

The SDN applications 214 can include a site configuration tracking application that keeps track of all site configurations for the RUF 108 sites (and others not shown in FIG. 2E) so that the settings of any RUF 108 site can be virtualized and applied by the RRUF 204 in response to the RUF 108 going down. In some embodiments, a site configuration can include a network configuration of the RUF 108 to be configured for the RRUF 204. The network configuration can specify network connectivity between the RUF 108, the VCF 102, the DUF 110, and the core network 106. In some embodiments, a site configuration can include a video processing equipment configuration of the RUF 108 to be configured for the RRUF 204. In some embodiments, a site configuration can include a configuration for a native RUF function provided by the RUF 108.

The SDN applications 214 also can include a disaster recovery application that saves network configurations and access information associated with the RUF 108 (and others not shown in FIG. 2E). In this manner, the network configuration and access information for a downed RUF (e.g., the RUF 108) can be deployed to the RFUF 204 site automatically.

The RRUF 204 can be configured with resources sufficient to handle the RUF 108 with the highest designated market area ("DMA") concentration of available RUFs 108 in the new satellite network system 200. Additional bandwidth on the core network 106 may be needed to backhaul video data from the RRUF 204 to the DUF 110. Whenever a RUF 108 goes down, the disaster recovery application of the SDN applications 214 can load the network configurations and configure the video processing equipment 124 at the RRUF 204 site to mirror the existing configuration and the flow state of the RUF 108 that went down. Once the orchestration and automation is completed, the RRUF 204 can take over for the primary RUF 108 as the source of the final video data for the corresponding DUF 110 to uplink to the satellite(s) 112.

Figure 2F:
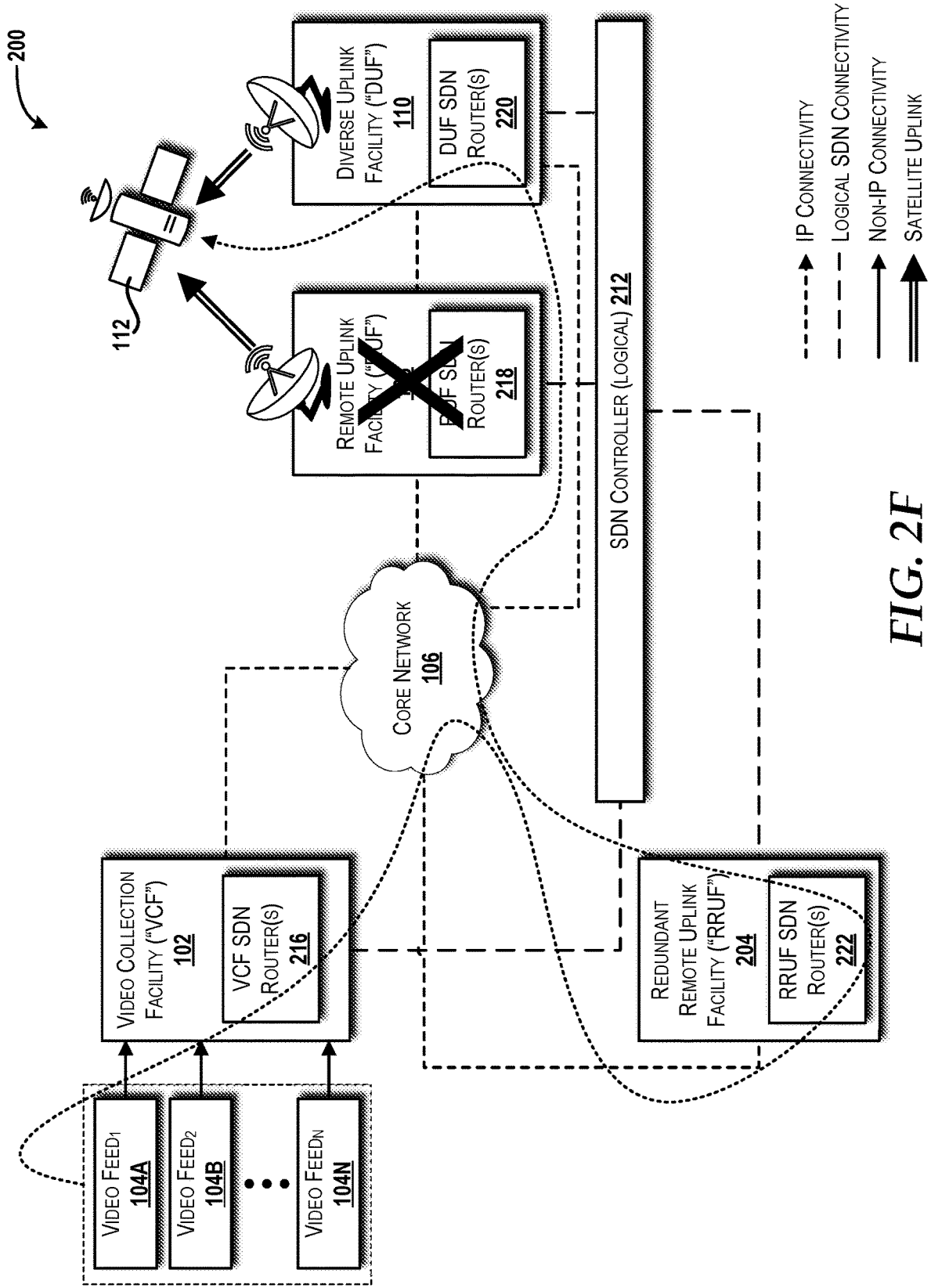
FIG. 2F is a block diagram illustrating the new satellite network system for providing the new linear satellite broadcast service during an adverse event that downs the RUF.

Turning now to FIG. 2F, the new satellite network system 200 as depicted in FIG. 2E is again shown, but during an adverse event that causes the RUF 108 to fail. As illustrated, the new satellite network system 200 not only provides resiliency for inclement weather, but also recovery from a physical site failure at an uplink facility due to a catastrophic event. In particular, when the RUF 108 goes down, the SDN controller 212 can cause instantiation and configuration of the RRUF 204 to take over multiplexing, encryption, and other video processing functions from the RUF 108, after which the RRUF 204 can provide video data to the DUF 110 for uplink to the satellite(s) 112.

The new satellite network system 200 provides the ability to decouple the RUFs 108 from video processing, which instead can be handled by the RRUF 204. This opens up opportunities to create a location agnostic and a cloud agnostic infrastructure, whereby video processing can be done anywhere, and video data can be uplinked from anywhere. This decoupling ensures that any outages are limited to just a fraction of the complete pipeline from ingestion to delivery. This builds resilience and fault tolerance in the new satellite network system 200. Furthermore, this can result in cost savings by moving redundant architecture components closer to the video source, or moving the components to a central encoding location. Indeed, the video processing functionality typically performed by the RUF 108 or the RRUF 204 as backup can be moved to a cloud computing platform (best shown in FIG. 10), and can introduce even more flexibility. This allows for savings on infrastructure and can leverage a flexible architecture whereby any video processing function/uplink function combination can be used. The following series of diagrams illustrates this flexibility.

Figure 2G:
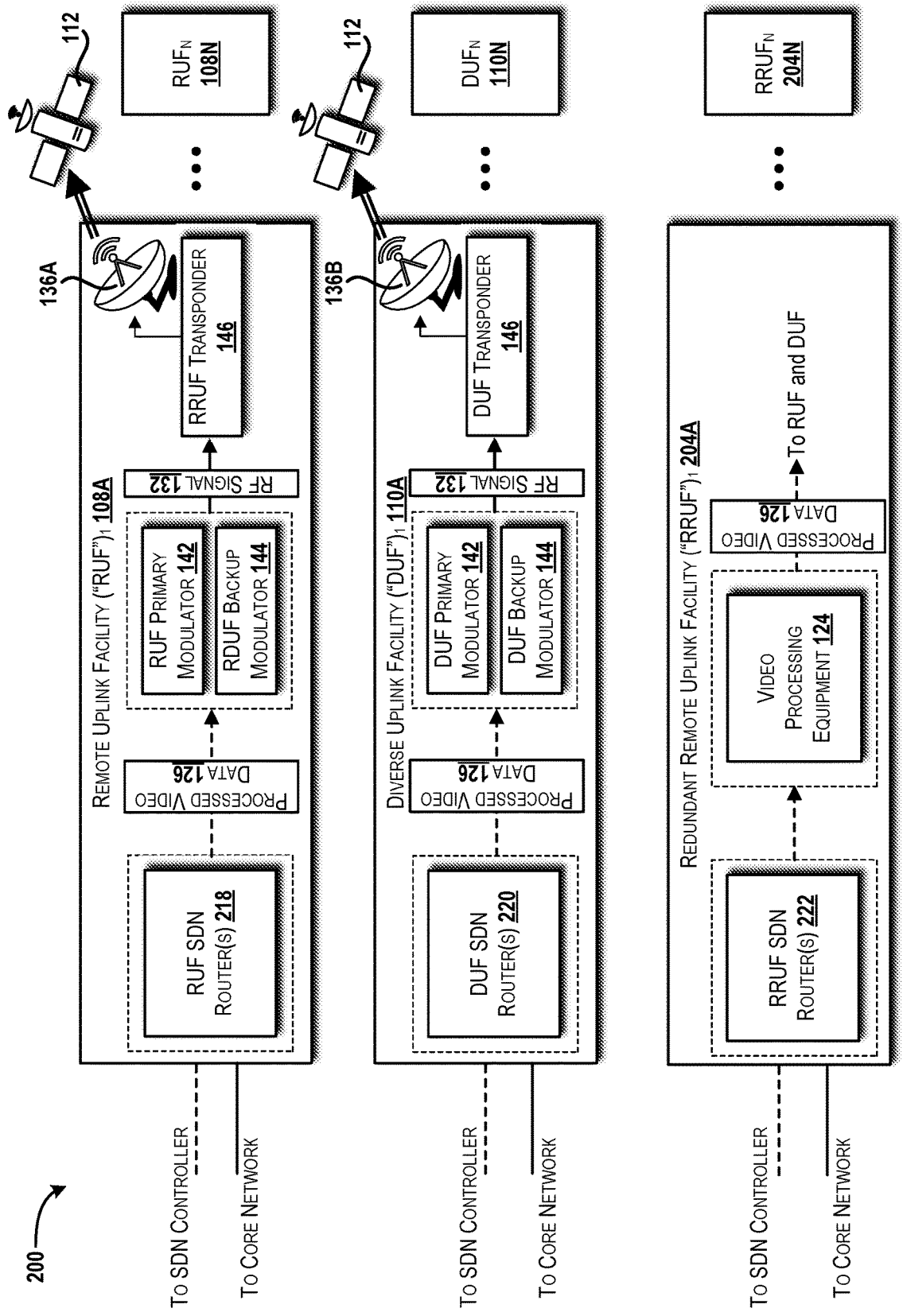
FIG. 2G is a block diagram illustrating the new satellite network system with video processing functionality and satellite uplink functionality decoupled and implemented in different facilities, according to an illustrative embodiment.
Figure 2H:
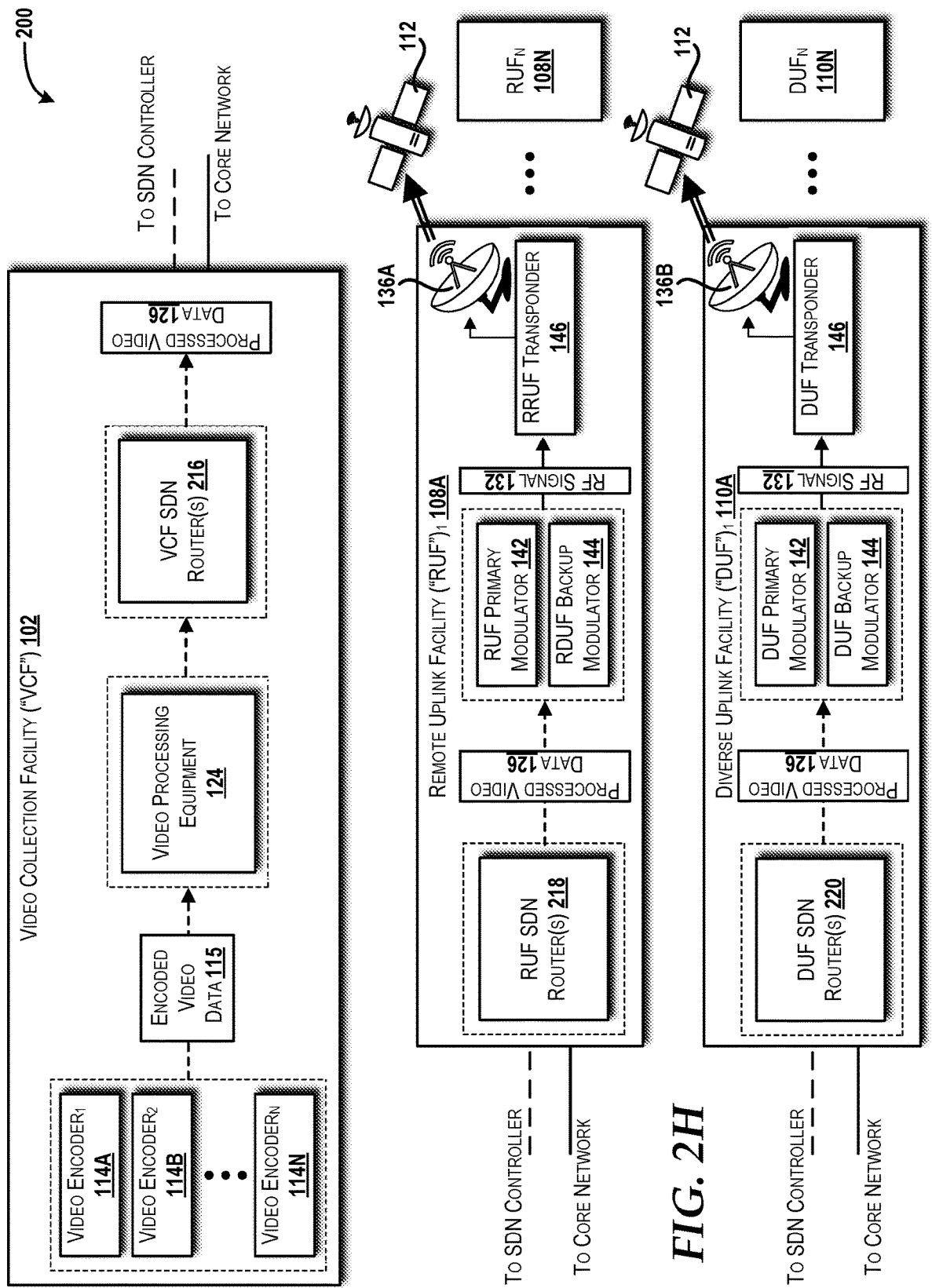
FIG. 2H is another block diagram illustrating the new satellite network system with video processing functionality and satellite uplink functionality decoupled and implemented in different facilities, according to an illustrative embodiment.
Figure 2I:
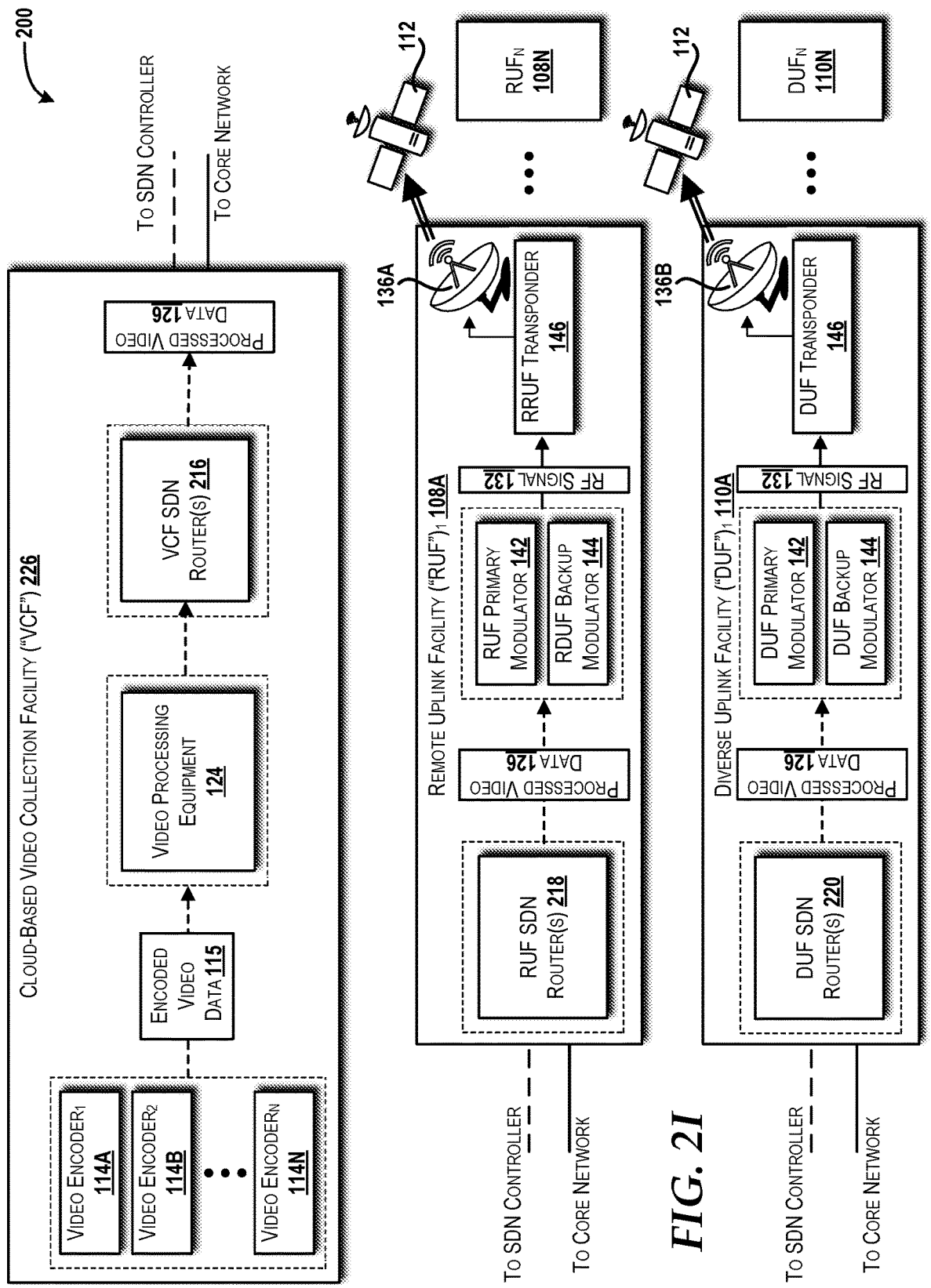
FIG. 2I is another block diagram illustrating the new satellite network system with video processing functionality and satellite uplink functionality decoupled and implemented in different facilities, according to an illustrative embodiment.
Figure 2J:
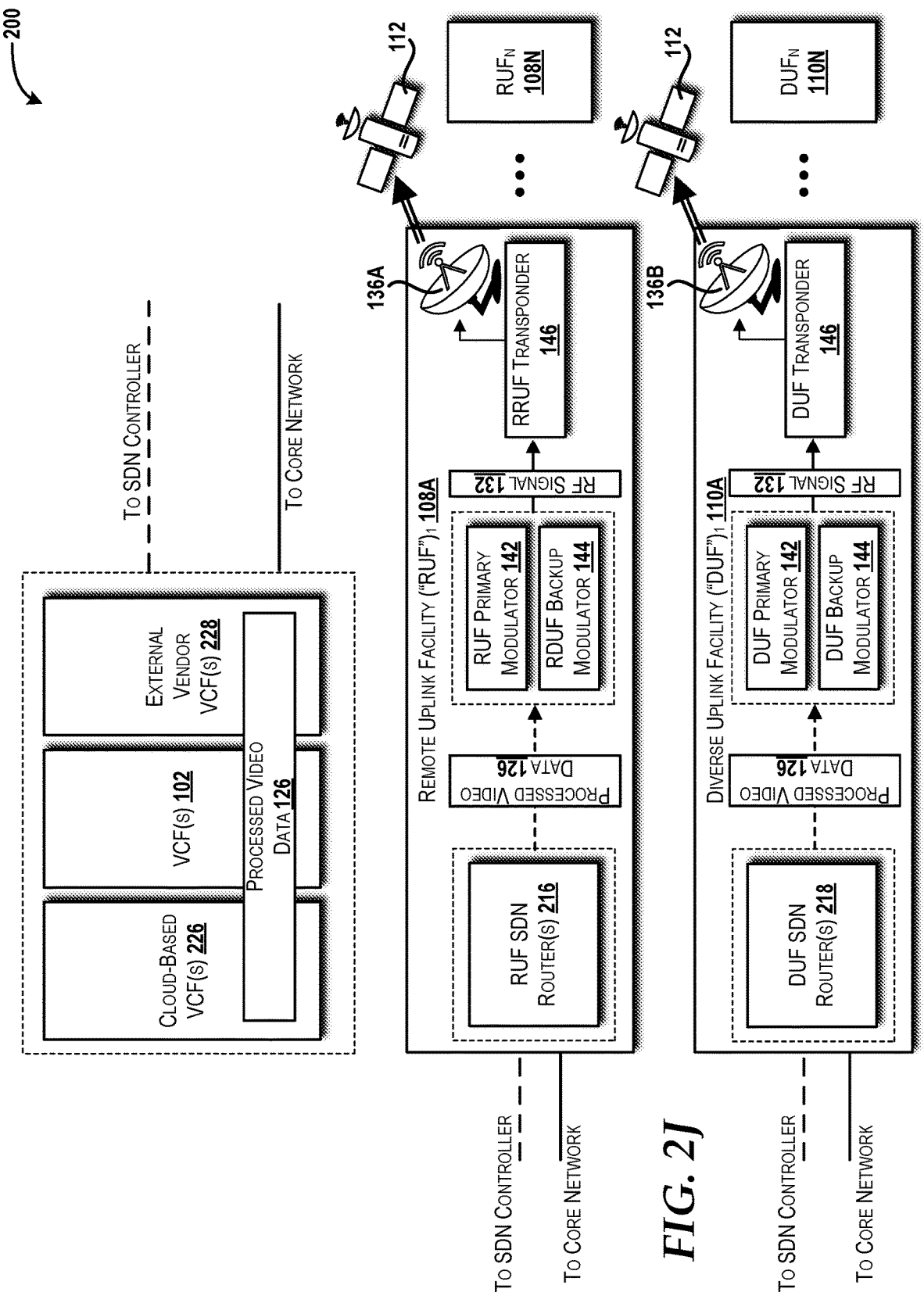
FIG. 2J is another block diagram illustrating the new satellite network system with video processing functionality and satellite uplink functionality decoupled and implemented in different facilities, according to an illustrative embodiment.

In FIG. 2G, some functionality has been decoupled from the RUF₁ 108A and moved to the RRUF₁ 204A, wherein the video processing equipment 124 is used to perform multiplexing, encryption, and other video processing functions. In this example, the RUF₁ 108A and the DUF₁ 110A handle uplinking of the processed video data 126 (i.e., processed by the RRUF₁ 204A) to the satellite(s) 112. In FIG. 2H, another decoupling option is depicted in which the video processing equipment 124 is moved to the VCF 102. In FIG. 2I, video encoding and processing can be moved to one or more cloud-based VCFs 226 as an alternative or in addition to the VCF 102. The cloud-based VCFs 226 can provide a cloud bursting option (e.g., when capacity on the VCF 102 is low or there is an outage) to improve the resiliency and fault-tolerance of the new satellite network system 200. In FIG. 2J, the new satellite network system 200 is shown with a combination of video collection facilities, including the VCF(s) 102, the cloud-based VCF(s) 226, and one or more external vendor VCF(s) 228 that can be provided to the RUFs 108 and/or the DUFs 110 for uplinking to the satellite(s) 112 as part of an uplink-as-a-service ("UAAS") model.

Figure 3:
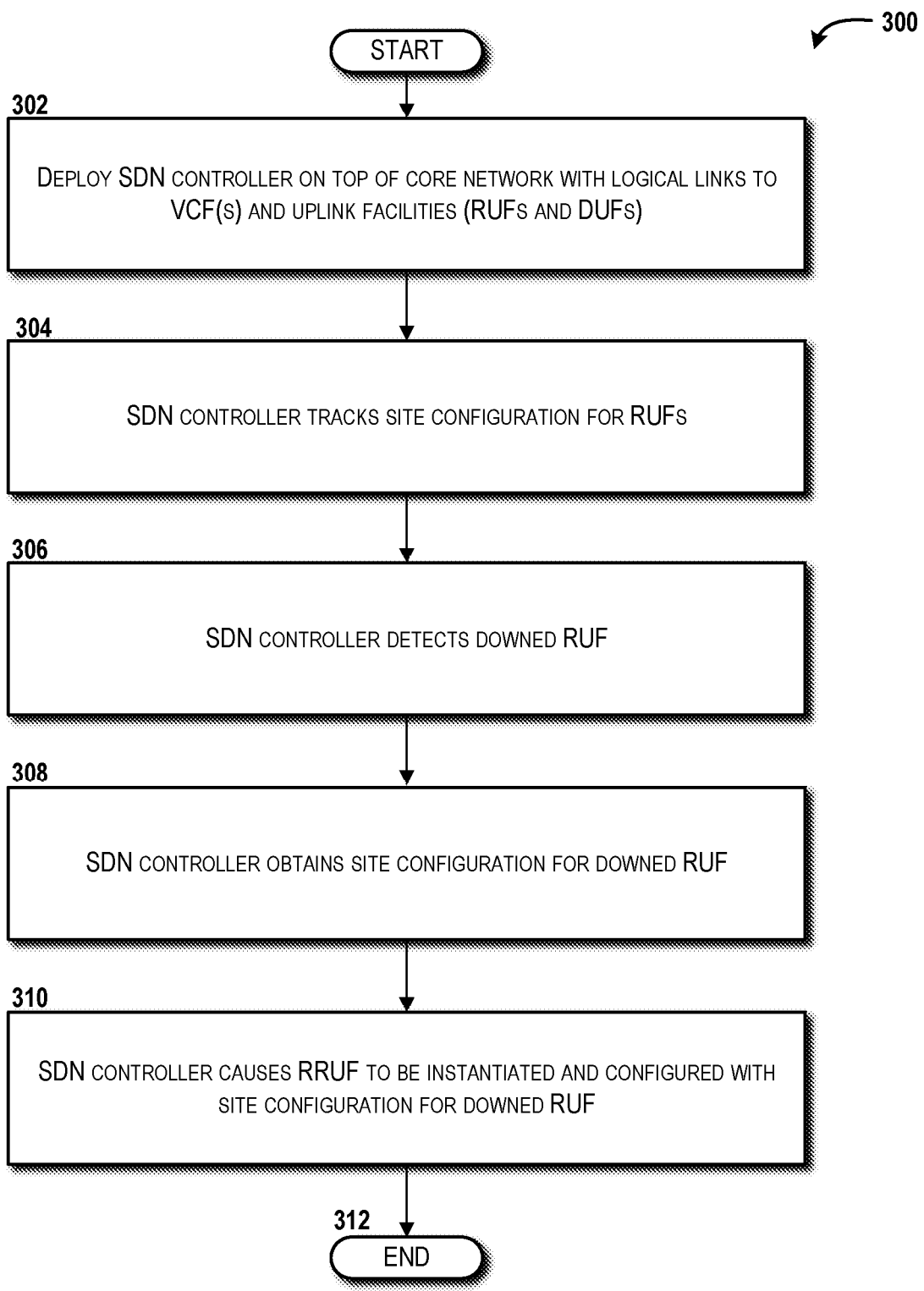
FIG. 3 is a flow diagram illustrating a method for implementing SDN in the new satellite network system, according to an illustrative embodiment.

Turning now to FIG. 3, aspects of a method 300 for implementing SDN in the new satellite network system 200 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multiprocessor systems, distributed computing systems, minicomputers, mainframe computers, personal computers, hand-held computing devices, microprocessor-based, programmable consumer electronics, network nodes, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 300 begins and proceeds to operation 302, where the SDN controller 212 is deployed on top of the core network 106 with logical links to the VCF(s) 102 and the uplink facilities, including the RUFs 108 and the DUFs 110. From operation 302, the method 300 proceeds to operation 304, where the SDN controller 212 tracks the site configurations for the RUFs 108. The site configurations include the hardware, software, and connectivity configurations that are to be replicated virtually by the RRUF 204 after failure of one or more of the RUFs 108.

From operation 304, the method 300 proceeds to operation 306, where the SDN controller 212 detects a downed RUF 108. From operation 306, the method 300 proceeds to operation 308, where the SDN controller 212 determines the site configuration of the downed RUF 108. From operation 308, the method 300 proceeds to operation 310, where the SDN controller 212 causes the RRUF 204 to be instantiated and configured with the site configuration of the downed RUF 108. From operation 310, the method 300 proceeds to o operation 312, where the method 300 ends.

Figure 4:
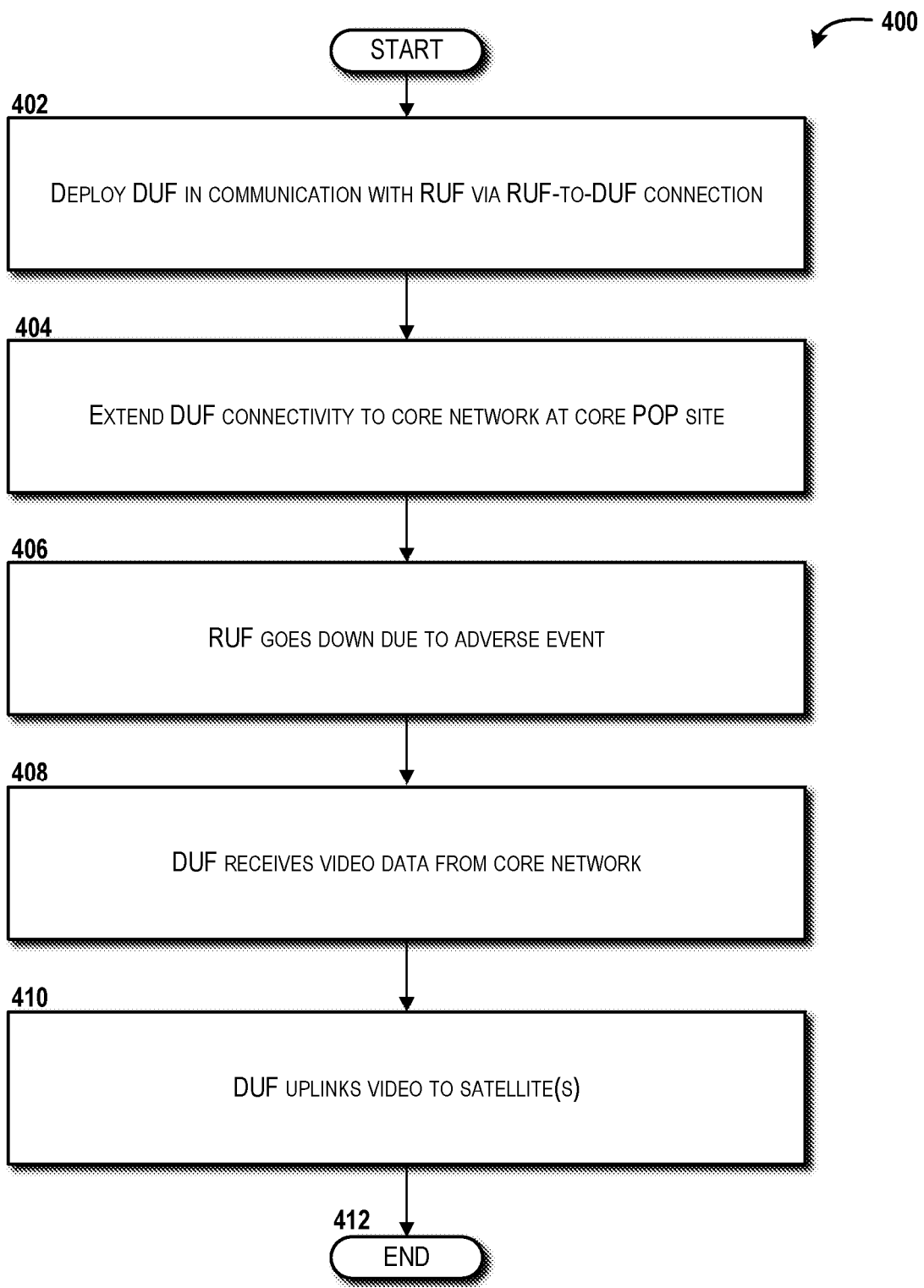
FIG. 4 is a flow diagram illustrating a method for extending connectivity of one or more DUFs in the new satellite network system, according to an illustrative embodiment.

Turning now to FIG. 4, aspects of a method 400 for extending connectivity of the DUF 110 will be described, according to an illustrative embodiment. The method 400 will be described in context of a single DUF. It should be understood that the method 400 can be performed using any number of DUFs 110. The method 400 begins and proceeds to operation 402, where a service provider deploys the DUF 110 in communication with the RUF 108 via a RUF-to-DUF connection (see FIG. 2A). From operation 402, the method 400 proceeds to operation 404, where the service provider extends the DUF connectivity to the core network 106 at one or more core POP sites 215A-215N (best shown in FIG. 2D).

From operation 404, the method 400 proceeds to operation 406, where the RUF 108 associated with the DUF 110 goes down due to an adverse event. From operation 406, the method 400 proceeds to operation 408, where the DUF 110 receives video data (e.g., the processed video data 126) from the core network 106. From operation 408, the method 400 proceeds to operation 410, where the DUF 110 uplinks the video data to the satellite(s) 112. From operation 410, the method 400 proceeds to operation 412, where the method 400 ends.

Figure 5:
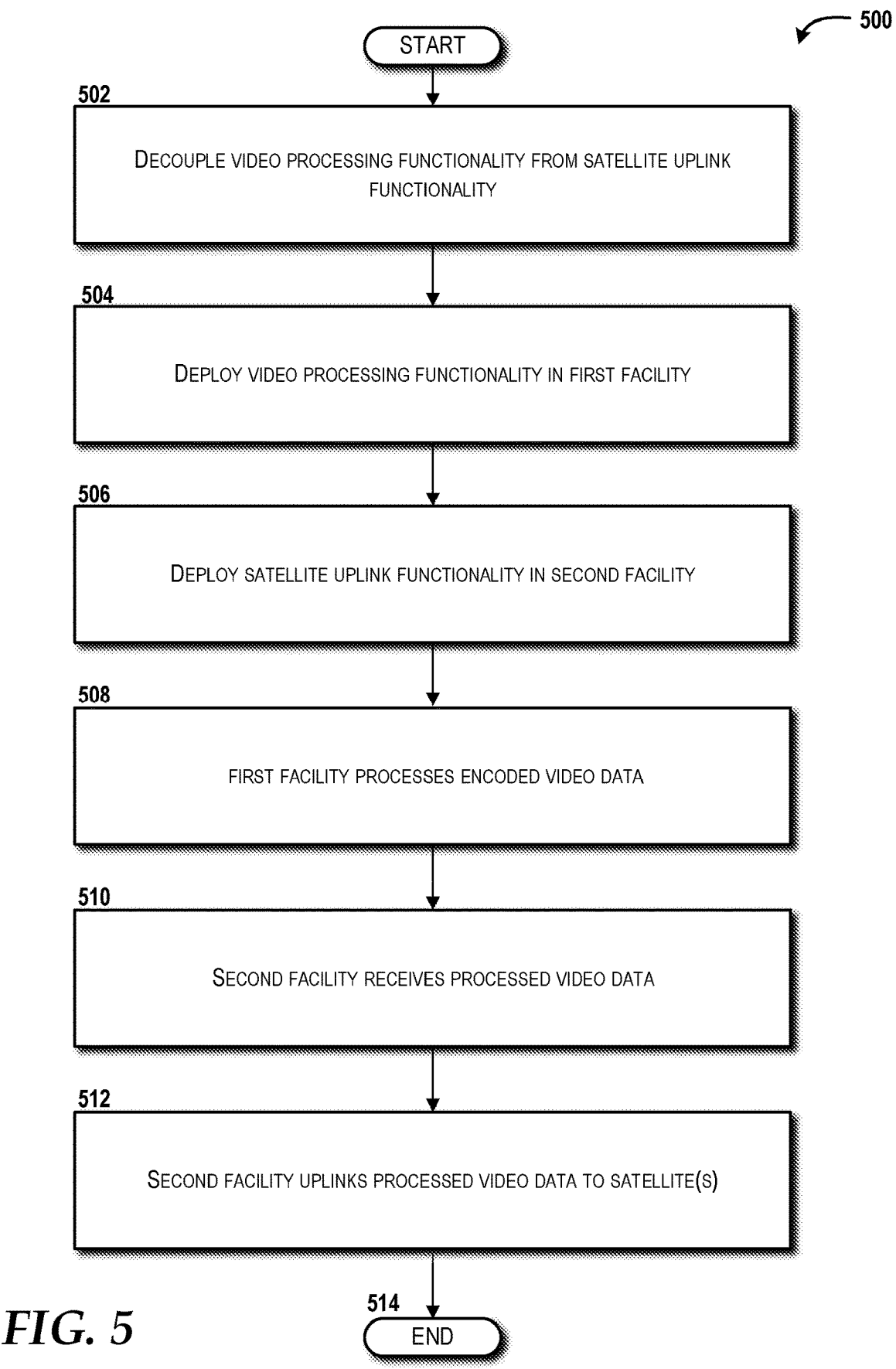
FIG. 5 is a flow diagram illustrating a method for decoupling video processing functionality from satellite uplink functionality in the new satellite network system, according to an illustrative embodiment.

Turning now to FIG. 5, aspects of a method 500 for decoupling video processing functionality from satellite uplink functionality will be described, according to an illustrative embodiment. The method 500 will be described in context of a two facility configuration in which a first facility provides video processing functionality and a second facility provides satellite uplink functionality. This concept can be extended to any number of facilities, and as such, the disclosed embodiment should not be construed as being limiting in any way.

The method 500 begins and proceeds to operation 502, where a service provider decouples the video processing functionality provided by the RUF 108 from the satellite uplink functionality provided by the RUF 108 and the DUF 110. From operation 502, the method 500 proceeds to operation 504, where the service provider deploys the video processing functionality in a first facility. In some embodiments, the first facility can be the VCF 102, the cloud-based VCF 226, the external vendor VCF 228, the RUF 108, the DUF 110, or the RRUF 204. From operation 504, the method 500 proceeds to operation 506, where the service provider deploys the satellite uplink functionality in a second facility. In some embodiments, the second facility can be the RUF 108, the DUF 110, or the RRUF 204.

From operation 506, the method 500 proceeds to operation 508, where the first facility processes video data (e.g., the encoded video data 115). From operation 508, the method 500 proceeds to operation 510, where the second facility receives the video data (e.g., the processed video data 126) from the first facility. From operation 510, the method 500 proceeds to operation 512, where the second facility uplinks the video data (e.g., the processed video data 126 carried by the RF signal 132) to the satellite(s) 112. From operation 512, the method 500 proceeds to operation 514, where the method 500 ends.

Figure 6:
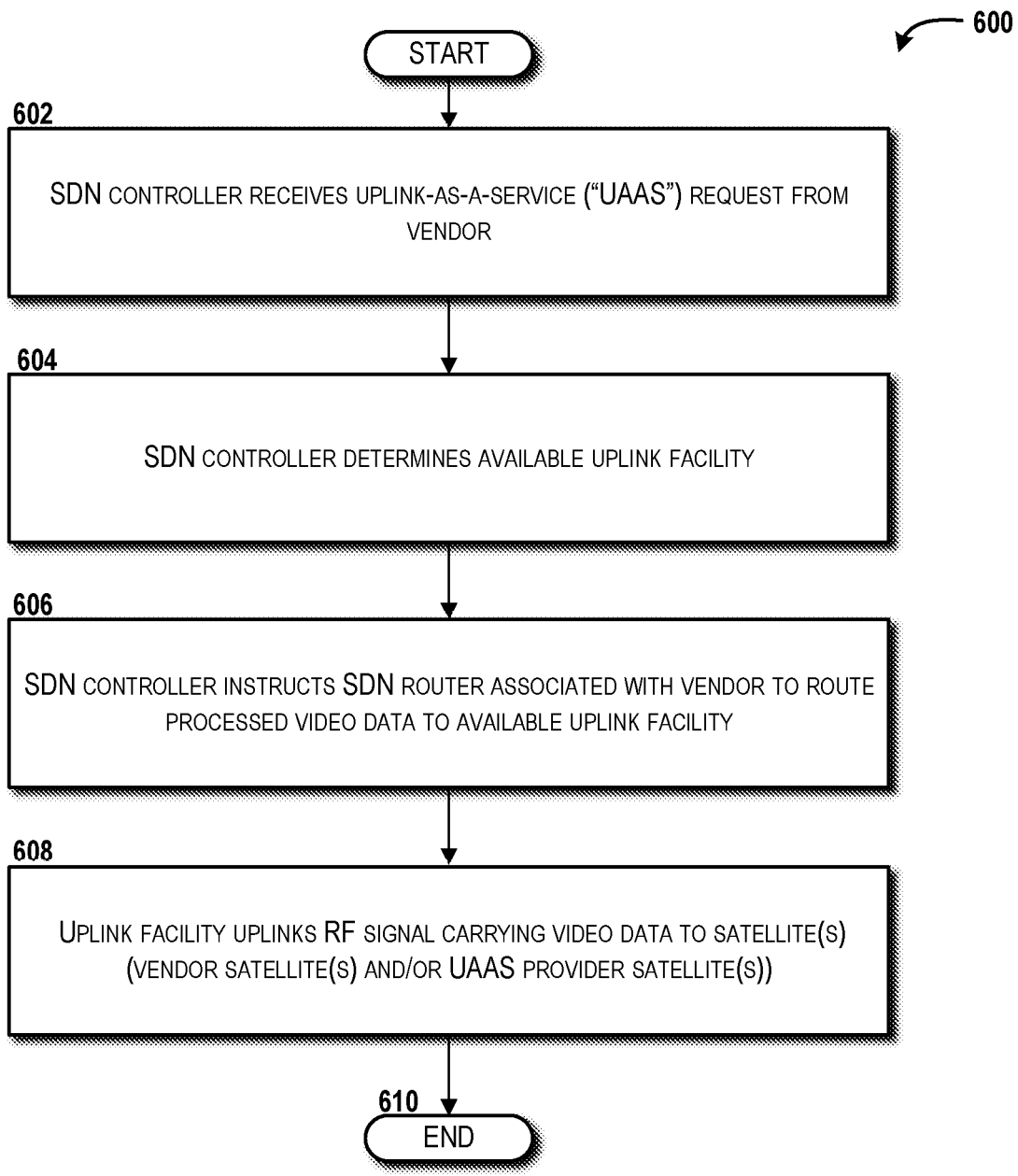
FIG. 6 is a flow diagram illustrating a method for providing uplink-as-a-service ("UAAS") via the new satellite network system, according to an illustrative embodiment.

Turning now to FIG. 6, aspects of a method 600 for providing UAAS will be described, according to an illustrative embodiment. The method 600 begins and proceeds to operation 602, where the SDN controller 212 receives a UAAS request from a vendor. From operation 602, the method 600 proceeds to operation 604, where the SDN controller 212 determines an available uplink facility. From operation 604, the method 600 proceeds to operation 606, where the SDN controller 212 instructs an SDN router associated with the vendor to route video data (e.g., the processed video data 126) to the available uplink facility. From operation 606, the method 600 proceeds to operation 608, where the uplink facility uplinks to the satellite(s) 112 the RF signal 132 carrying the processed video data 126, which can include one or more satellites associated with the vendor and/or one or more satellites associated with the UAAS provider. From operation 608, the method 600 proceeds to operation 610, where the method 600 ends.

Figure 7:
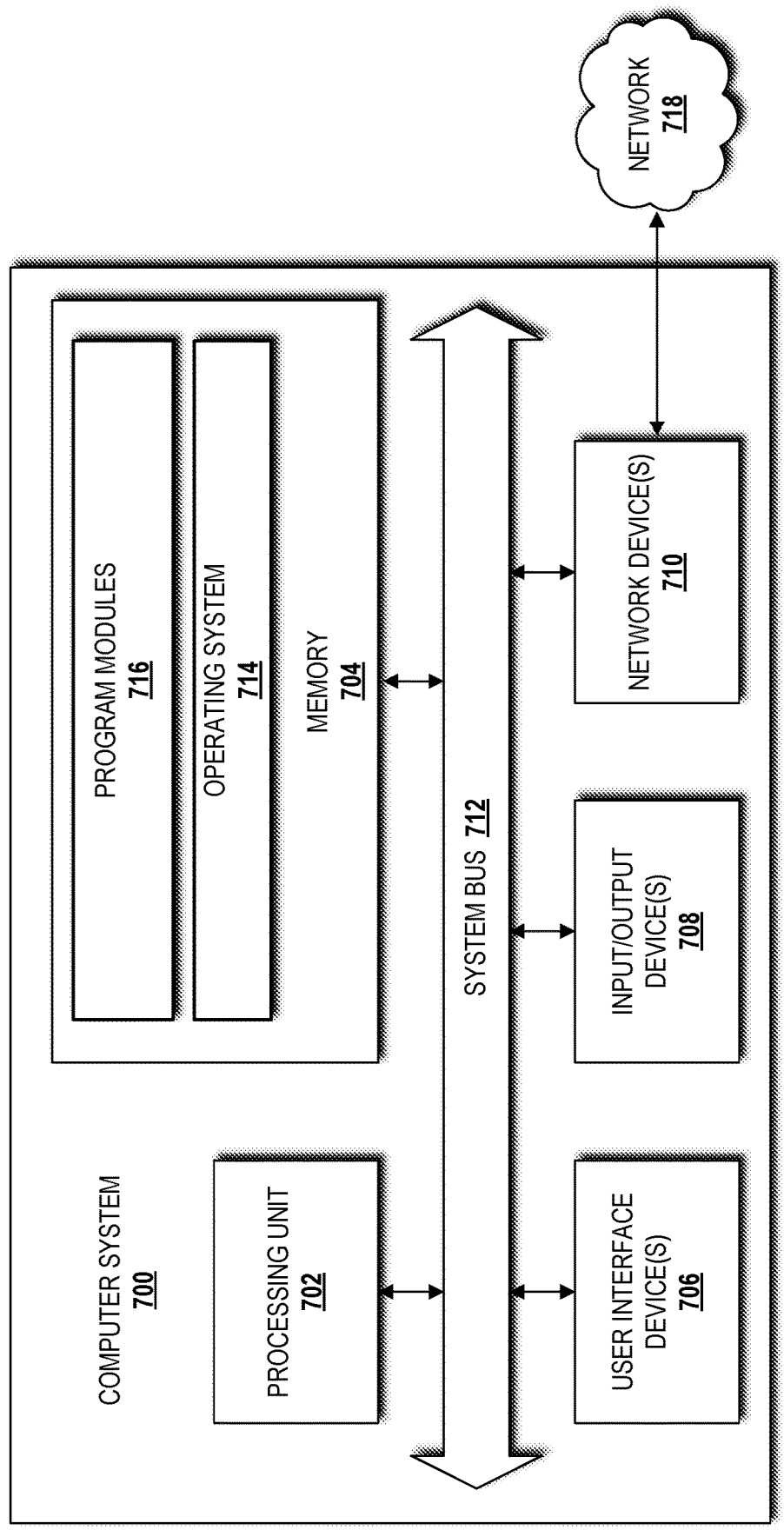
FIG. 7 is a block diagram illustrating an example computer system capable of implementing aspects of the embodiments presented herein.

Turning now to FIG. 7, a block diagram illustrating a computer system 700 configured to provide the functionality in accordance with various embodiments of the concepts and technologies disclosed herein. The systems, devices, and other components disclosed herein, or any combination thereof, can utilize or can execute upon, at least in part, an architecture that is the same as or at least similar to the architecture of the computer system 700. It should be understood, however, that modification to the architecture may be made to facilitate certain interactions among elements described herein.

The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 716 may include various software and/or program modules to perform the various operations described herein. The program modules 716 and/or other programs can be embodied in computer-readable media containing instructions that, when executed by the processing unit 702, perform various operations such as those described herein. According to embodiments, the program modules 716 may be embodied in hardware, software, firmware, or any combination thereof.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, PDAs, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer. In some embodiments, the I/O devices 708 can be used for manual controls for operations to exercise under certain emergency situations.

The network devices 710 enable the computer system 700 to communicate with other networks or remote systems via a network 718. Examples of the network devices 710 include, but are not limited to, a modem, a RF or infrared ("IR") transceiver, a telephonic interface, a bridge, a router, or a network card. The network 718 may be or may include a wireless network such as, but not limited to, a WLAN, a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 718 may be or may include a wired network such as, but not limited to, a Wide Area Network ("WAN"), a wired Personal Area Network ("PAN"), or a wired Metropolitan Area Network ("MAN"). The network 718 can be or can include any of the networks described herein, such as the core network 106, other networks, and/or any combination thereof.

Figure 8:
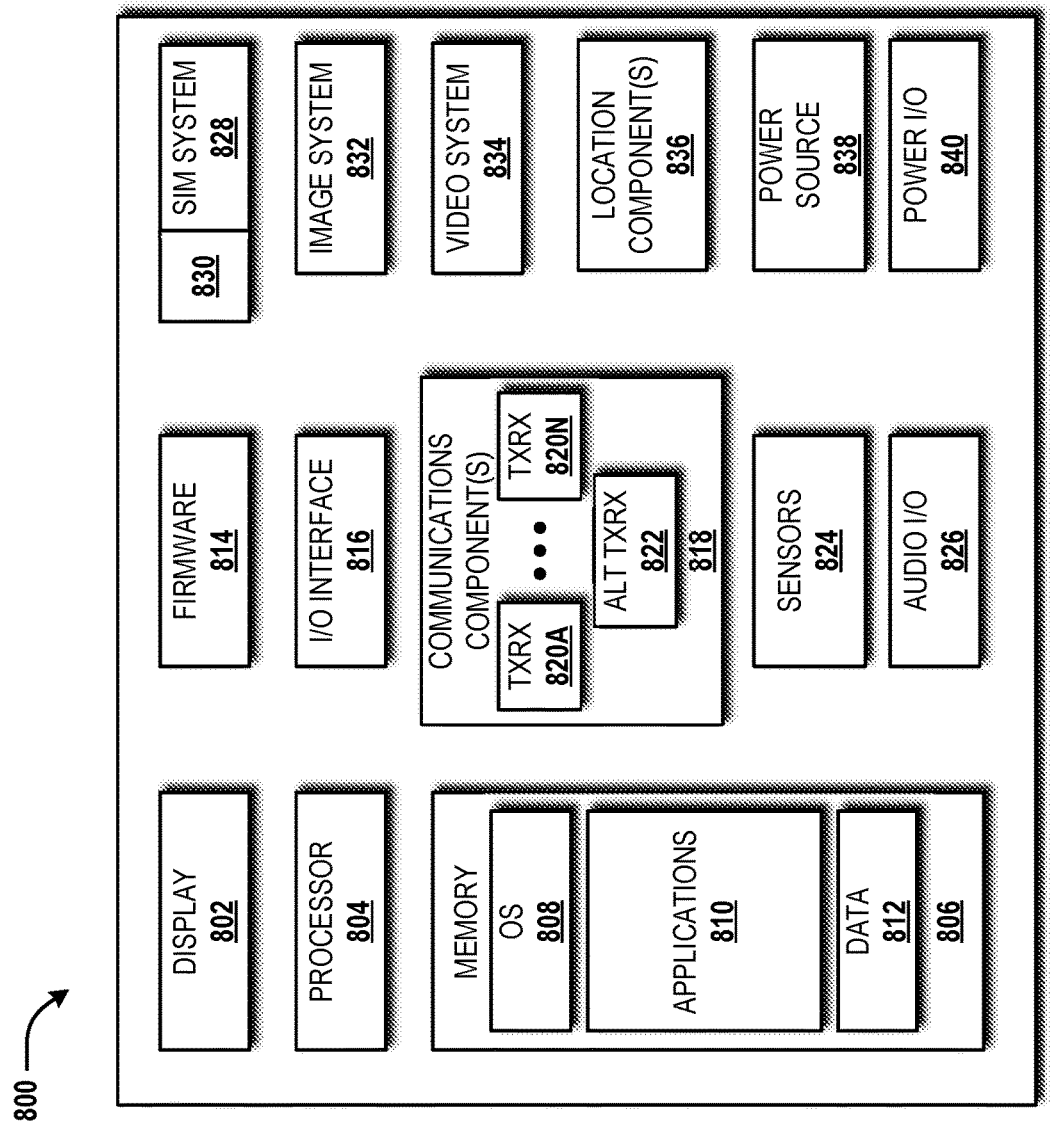
FIG. 8 is a block diagram illustrating an example mobile device capable of implementing aspects of the embodiments disclosed herein.

Turning now to FIG. 8, a block diagram illustrating an example mobile device 800, according to an illustrative embodiment. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810, other computer-executable instructions stored in a memory 806, or the like. In some embodiments, the applications 810 also can include a user interface ("UI") application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, viewing account information, answering/initiating calls, entering/deleting data, entering and setting user IDs and passwords for device access, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, one or more identifiers, and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, user information, organization information, presence status information, user IDs, passwords, and application initiation (start-up) requests. In some embodiments, the I/O interface 816 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMA ONE, CDMA2000, LTE, and various other 2G, 2.5G, 3G, 4G, 5G, and greater generation technology standards, such as those described herein above as the RATs and the ad-hoc RATs. Moreover, the communications component 818 may facilitate communications over various channel access methods (which may or may not be used by the aforementioned standards) including, but not limited to, TDMA, FDMA, W-CDMA, Orthogonal Frequency-Division Multiplexing ("OFDM"), Space-Division Multiple Access ("SDMA"), and the like.

In addition, the communications component 818 may facilitate data communications GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-820N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 838. The location components 836 can be configured to send and/or receive signals to determine a geographic location of the mobile device 800. According to various embodiments, the location components 836 can send and/or receive signals from global positioning system ("GPS") devices, assisted GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
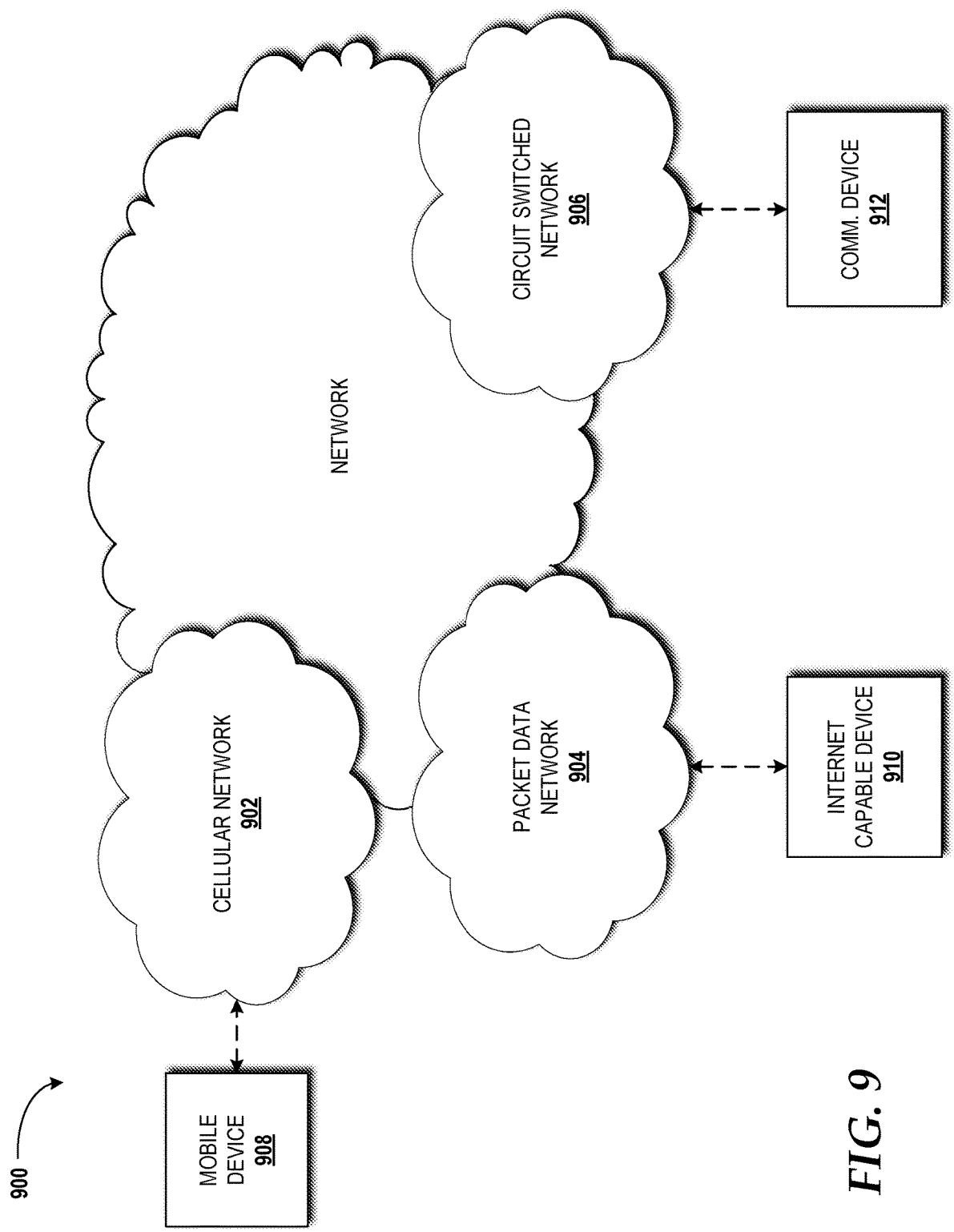
FIG. 9 is a block diagram schematically illustrating a network, according to an illustrative embodiment.

Turning now to FIG. 9, a schematic illustration of a network 900 will be described, according to an illustrative embodiment. The network 900 includes a cellular network 902, a packet data network 904, for example, the Internet, and a circuit switched network 906, for example, a publicly switched telephone network ("PSTN"). The cellular network 902 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 902 also includes radios and nodes for receiving and transmitting voice, data, and combinations thereof to and from radio transceivers, networks, the packet data network 904, and the circuit switched network 906.

A mobile communications device 912, such as, for example, a mobile terminal, a PDA, a laptop computer, a handheld computer, and combinations thereof, can be operatively connected to the cellular network 902. The cellular network 902 can be configured as a 2G GSM network and can provide data communications via GPRS and/or EDGE. Additionally, or alternatively, the cellular network 902 can be configured as a 3G UMTS network and can provide data communications via the HSPA protocol family, for example, HSDPA, EUL (also referred to as HSUPA), and HSPA+. The cellular network 902 also is compatible with 4G mobile communications standards as well as evolved and future mobile standards.

The packet data network 904 includes various devices, for example, servers, computers, databases, and other devices in communication with one another, as is generally known. The packet data network 904 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 904 includes or is in communication with the Internet. The circuit switched network 906 includes various hardware and software for providing circuit switched communications. The circuit switched network 906 may include, or may be, what is often referred to as a plain old telephone system ("POTS"). The functionality of a circuit switched network 906 or other circuit-switched network are generally known and will not be described herein in detail.

The illustrated cellular network 902 is shown in communication with the packet data network 904 and a circuit switched network 906, though it should be appreciated that this is not necessarily the case. One or more Internet-capable devices 910, for example, a PC, a laptop, a portable device, or another suitable device, can communicate with one or more cellular networks 902, and devices connected thereto, through the packet data network 904. It also should be appreciated that the Internet-capable device 910 can communicate with the packet data network 904 through the circuit switched network 906, the cellular network 902, and/or via other networks (not illustrated).

As illustrated, a communications device 912, for example, a telephone, facsimile machine, modem, computer, or the like, can be in communication with the circuit switched network 906, and therethrough to the packet data network 904 and/or the cellular network 902. It should be appreciated that the communications device 912 can be an Internet-capable device, and can be substantially similar to the Internet-capable device 910. In the specification, the network 900 is used to refer broadly to any combination of the networks 902, 904, 906. It should be appreciated that substantially all of the functionality described with reference to the network 900 can be performed by the cellular network 902, the packet data network 904, and/or the circuit switched network 906, alone or in combination with other networks, network elements, and the like. The network 900 can include the functionality of any of the networks described herein.

Figure 10:
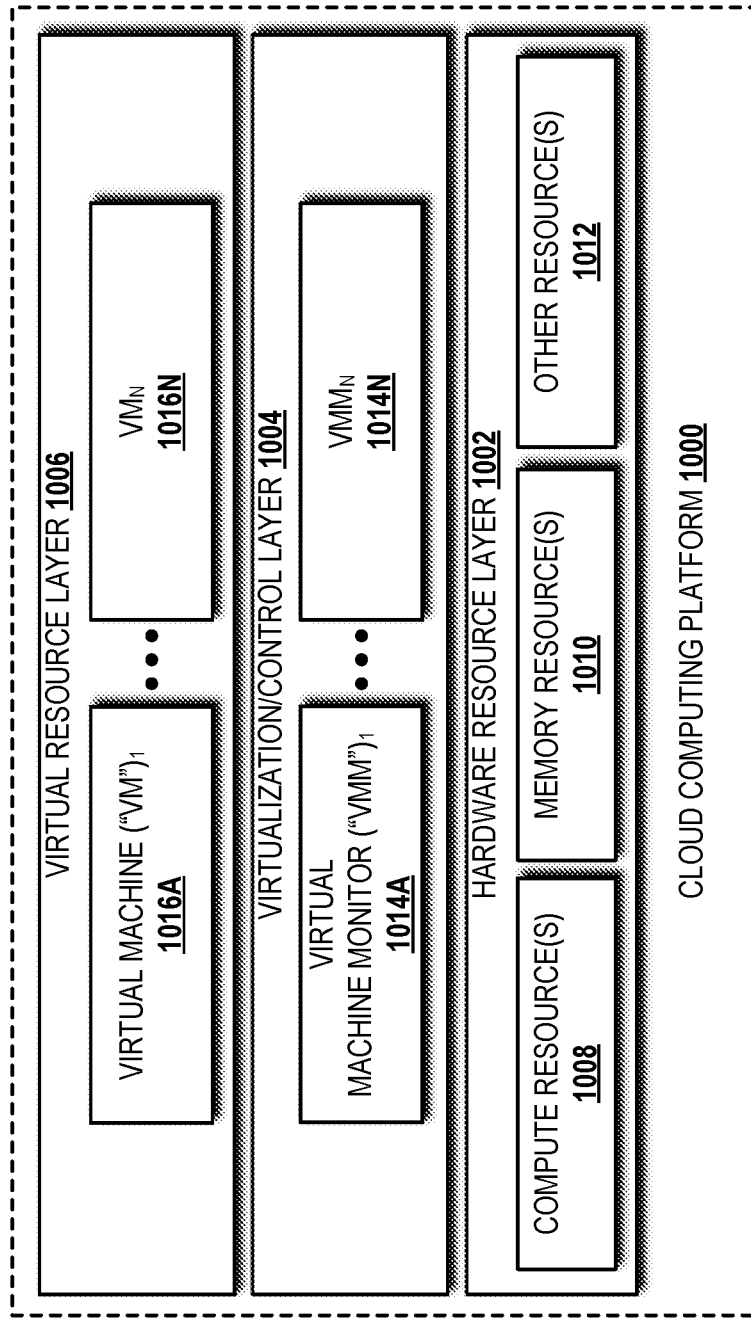
FIG. 10 is a block diagram illustrating an example cloud computing platform capable of implementing aspects of the embodiments presented herein.

Turning now to FIG. 10, a cloud computing platform 1000 will be described, according to an exemplary embodiment. The architecture of the cloud computing platform 1000 can be used to implement, at least in part, the RUF(s) 108, the DUF(s) 110, the RRUF(s) 204, the cloud-based VCF(s) 226, the external vendor VCF(s) 228, and/or other systems, devices, facilities as virtual counterparts to physical systems, devices, and facilities disclosed herein. The cloud computing platform 1000 can be utilized to implement, at least in part, components of the SDN network 202, such as the SDN elements 210 and/or the SDN controller 212. The cloud computing platform 1000 is a shared infrastructure that can support multiple services and network applications. The illustrated cloud computing platform 1000 includes a hardware resource layer 1002, a virtualization/control layer 1004, and a virtual resource layer 1006 that work together to perform operations as will be described in detail herein.

The hardware resource layer 1002 provides hardware resources, which, in the illustrated embodiment, include one or more compute resources 1008, one or more memory resources 1010, and one or more other resources 1012. The compute resource(s) 1008 can include one or more hardware components that perform computations to process data, and/or to execute computer-executable instructions of one or more application programs, operating systems, and/or other software. The compute resources 1008 can include one or more central processing units ("CPUs") configured with one or more processing cores. The compute resources 1008 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 1008 can include one or more discrete GPUs. In some other embodiments, the compute resources 1008 can include CPU and GPU components that are configured in accordance with a co-processing CPU/GPU computing model, wherein the sequential part of an application executes on the CPU and the computationally-intensive part is accelerated by the GPU. The compute resources 1008 can include one or more system-on-chip ("SoC") components along with one or more other components, including, for example, one or more of the memory resources 1010, and/or one or more of the other resources 1012. In some embodiments, the compute resources 1008 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 1008 can be or can include one or more hardware components architected in accordance with an ARM architecture, available for license from ARM HOLDINGS of Cambridge, United Kingdom. Alternatively, the compute resources 1008 can be or can include one or more hardware components architected in accordance with an x86 architecture, such an architecture available from INTEL CORPORATION of Mountain View, Calif., and others. Those skilled in the art will appreciate the implementation of the compute resources 1008 can utilize various computation architectures, and as such, the compute resources 1008 should not be construed as being limited to any particular computation architecture or combination of computation architectures, including those explicitly disclosed herein.

The memory resource(s) 1010 can include one or more hardware components that perform storage operations, including temporary or permanent storage operations. In some embodiments, the memory resource(s) 1010 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 1008.

The other resource(s) 1012 can include any other hardware resources that can be utilized by the compute resources(s) 1008 and/or the memory resource(s) 1010 to perform operations described herein. The other resource(s) 1012 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 1002 can be virtualized by one or more virtual machine monitors ("VMMs") 1014A-1014N (also known as "hypervisors"; hereinafter "VMMs 1014") operating within the virtualization/control layer 1004 to manage one or more virtual resources that reside in the virtual resource layer 1006. The VMMs 1014 can be or can include software, firmware, and/or hardware that alone or in combination with other software, firmware, and/or hardware, manages one or more virtual resources operating within the virtual resource layer 1006.

The virtual resources operating within the virtual resource layer 1006 can include abstractions of at least a portion of the compute resources 1008, the memory resources 1010, the other resources 1012, or any combination thereof. In the illustrated embodiment, the virtual resource layer 1006 includes VMs 1016A-1016N (hereinafter "VMs 1016"). Each of the VMs 1016 can execute one or more software applications, such as, for example, software application including instructions to implement, at least in part, one or more components of the SDN network 202 (e.g., the SDN controllers 212, the SDN elements 210, and/or the SDN applications 214), and/or the RRUF 204.

Based on the foregoing, it should be appreciated that concepts and technologies directed to redundancy for satellite uplink facilities using SDN have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A satellite network system comprising: a video collection facility; a remote uplink facility; a diverse uplink facility in direct communication with a core network; and a software-defined networking ("SDN") controller that operates in an SDN network that provides logical SDN links to the video collection facility, the remote uplink facility, the diverse uplink facility, and the core network, wherein the SDN controller comprises a processor, and a memory that stores instructions that, when executed by the processor, cause the processor to perform operations comprising tracking a site configuration of the remote uplink facility, detecting that the remote uplink facility has been downed due to an adverse event, obtaining the site configuration of the remote uplink facility, causing a redundant remote uplink facility to be instantiated, and causing the redundant remote uplink facility to be configured in accordance with the site configuration of the remote uplink facility, wherein the site configuration comprises a network configuration of the remote uplink facility to be configured for the redundant remote uplink facility, and wherein the network configuration specifies network connectivity between the remote uplink facility, the video collection facility, the diverse uplink facility, and the core network.

2. The satellite network system of claim 1, wherein the site configuration further comprises a video processing equipment configuration of the remote uplink facility to be configured for the redundant remote uplink facility.

3. The satellite network system of claim 1, wherein the site configuration further comprises a configuration of a native remote uplink facility function provided by the remote uplink facility.

4. The satellite network system of claim 1, wherein causing the redundant remote uplink facility to be instantiated comprises causing the redundant remote uplink facility to be instantiated on a cloud computing platform.

5. The satellite network system of claim 4, wherein causing the redundant remote uplink facility to be instantiated on the cloud computing platform comprises causing the redundant remote uplink facility to be instantiated on the cloud computing platform with a plurality of virtual resources capable of handling a designated marketing area having a highest concentration.

6. A method comprising: tracking, by a software-defined networking ("SDN") controller, a site configuration of a remote uplink facility; detecting, by the SDN controller, that the remote uplink facility has been downed due to an adverse event; obtaining, by the SDN controller, the site configuration of the remote uplink facility; causing, by the SDN controller, a redundant remote uplink facility to be instantiated; and causing, by the SDN controller, the redundant remote uplink facility to be configured in accordance with the site configuration of the remote uplink facility, wherein the site configuration comprises a network configuration of the remote uplink facility to be configured for the redundant remote uplink facility, and wherein the network configuration specifies network connectivity between the remote uplink facility, a video collection facility, a diverse uplink facility, and a core network.

7. The method of claim 6, wherein the site configuration further comprises a video processing equipment configuration of the remote uplink facility to be configured for the redundant remote uplink facility.

8. The method of claim 6, wherein the site configuration further comprises a configuration of a native remote uplink facility function provided by the remote uplink facility.

9. The method of claim 6, wherein causing, by the SDN controller, the redundant remote uplink facility to be instantiated comprises causing the redundant remote uplink facility to be instantiated on a cloud computing platform.

10. The method of claim 9, wherein causing, by the SDN controller, the redundant remote uplink facility to be instantiated on the cloud computing platform comprises causing the redundant remote uplink facility to be instantiated on the cloud computing platform with a plurality of virtual resources capable of handling a designated marketing area having a highest concentration.

11. A computer-readable storage medium having instructions stored herein that, when executed by a processor, cause the processor to perform operations comprising: tracking a site configuration of a remote uplink facility; detecting that the remote uplink facility has been downed due to an adverse event; obtaining the site configuration of the remote uplink facility; causing a redundant remote uplink facility to be instantiated; and causing the redundant remote uplink facility to be configured in accordance with the site configuration of the remote uplink facility, wherein the site configuration comprises a network configuration of the remote uplink facility to be configured for the redundant remote uplink facility, and wherein the network configuration specifies network connectivity between the remote uplink facility, a video collection facility, a diverse uplink facility, and a core network.

12. The computer-readable storage medium of claim 11, wherein the site configuration further comprises a video processing equipment configuration of the remote uplink facility to be configured for the redundant remote uplink facility.

13. The computer-readable storage medium of claim 11, wherein the site configuration further comprises a configuration of a native remote uplink facility function provided by the remote uplink facility.

14. The computer-readable storage medium of claim 11, wherein causing the redundant remote uplink facility to be instantiated comprises causing the redundant remote uplink facility to be instantiated on a cloud computing platform with a plurality of virtual resources capable of handling a designated marketing area having a highest concentration.

* * * * *